United States Patent [19]
Nakamura

[11] Patent Number: 6,064,839
[45] Date of Patent: May 16, 2000

[54] IMAGE FORMING APPARATUS AND METHOD CAPABLE OF PREVENTING AN OPPORTUNISTIC USE THEREOF

[75] Inventor: Hidenobu Nakamura, Kariya, Japan

[73] Assignee: Minolta Co., Ltd., Osaka, Japan

[21] Appl. No.: 09/164,706

[22] Filed: Oct. 1, 1998

[30] Foreign Application Priority Data

Oct. 3, 1997 [JP] Japan ..................................... 9-271106

[51] Int. Cl.[7] .......................... G03G 15/00; G03G 21/00
[52] U.S. Cl. .................. 399/80; 399/18; 399/43
[58] Field of Search .............................. 399/8, 9, 10, 18, 399/16, 21, 43, 79, 80, 76, 77, 82; 395/113, 114; 364/130; 358/1.14, 1.15

[56] References Cited

U.S. PATENT DOCUMENTS

| | | | |
|---|---|---|---|
| 5,066,977 | 11/1991 | Yoshizuka | 399/80 |
| 5,162,847 | 11/1992 | Watanabe | 399/79 |
| 5,293,196 | 3/1994 | Kaneko et al. | 399/18 |
| 5,608,494 | 3/1997 | Ogura et al. | 399/80 X |
| 5,903,801 | 5/1999 | Nakamura | 399/79 |

FOREIGN PATENT DOCUMENTS

| | | |
|---|---|---|
| 4-301659 | 10/1992 | Japan . |
| 6-102730 | 4/1994 | Japan . |
| 6-102731 | 4/1994 | Japan . |

*Primary Examiner*—Sophia S. Chen
*Attorney, Agent, or Firm*—Morrison & Foerster LLP

[57] ABSTRACT

An image forming apparatus is provided with print request controls for accepting a print request relevant to a job from an operator on condition that use of an image forming section is permitted by permission controls. The image forming apparatus is also provided with print controls for making the image forming section execute image formation relevant to the above job according to instructions by the print request controls. The image forming apparatus is further provided with inhibition controls for inhibiting acceptance of a print request relevant to a job different from the above job by the print request controls, regardless of the presence or absence of permission by the permission controls after accepting the print request relevant to the above job by the print request controls. Thereby, it is possible to prevent another person from opportunistically using the apparatus even when the operator forgets to cancel the permission of use of the image forming section by the permission controls.

14 Claims, 25 Drawing Sheets

IMAGE FORMING APPARATUS AND METHOD CAPABLE OF PREVENTING AN OPPORTUNISTIC USE THEREOF

This application is based on application No. 9-271106 filed in Japan, the contents of which are hereby incorporated by reference.

BACKGROUND OF THE INVENTION

The present invention relates to an image forming apparatus and method. The present invention relates, in particular, to an image forming apparatus for executing image formation relevant to a job designated by an operator, the apparatus being represented by a color/monochrome copying machine, a printer, a facsimile or the like.

The term "job" means a sequence of operations including inputting and developing of image data, transferring an image onto a paper sheet and discharging of the paper sheet.

There is a known prior art copying machine that enables a copying operation when a key counter is set and inhibits the copying operation when the key counter is pulled out or reset (for example, Japanese Patent Laid-Open Publication No. 4-301659).

However, the above copying machine has a problem that, when the operator leaves the key counter set after ending a copying operation, another person can make copies by means of the key counter used by the previous operators.

SUMMARY OF THE INVENTION

Accordingly, an object of the present invention is to provide an image forming apparatus that is provided with a permission device permitting the use of an image forming section on the basis of a specified operation of an operator and is able to prevent use by another person using the operators "key" even when the operator forgets to cancel the permission of use of the image forming section by the permission device.

In one aspect of the present invention, an image forming apparatus comprises a print request controls for accepting a print request; permission controls permitting a print operation of the image forming apparatus in response to a specified operation executed by an operator; print controls executing a print job corresponding to the print request when the print request has been accepted by the print request controls in a state in which print operation has been permitted by the permission controls; and inhibition controls, when the print request has been accepted by the print controls, inhibiting execution of a subsequent print job corresponding to a subsequent print request.

In another aspect of the present invention, an image forming apparatus comprises print request controls accepting a print request; permission controls bringing the image forming apparatus into an operable state in response to a specified operation executed by an operator; and print controls, when a first print request has been accepted by the print request controls, executing a print job corresponding to the accepted first print request and inhibiting execution of a subsequent print job corresponding to a subsequent print request.

In yet another aspect of the present invention, an image forming method comprises accepting a print request; permitting a print operation in response to a specified operation executed by an operator; executing a print job corresponding to the print request when the print request is accepted in a state in which print operation has been permitted; and inhibiting execution of a subsequent print job corresponding to a subsequent print request when the current print request has been accepted.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Preferred embodiments of the image forming apparatus of the present invention will be described in detail below.

Figure 1:
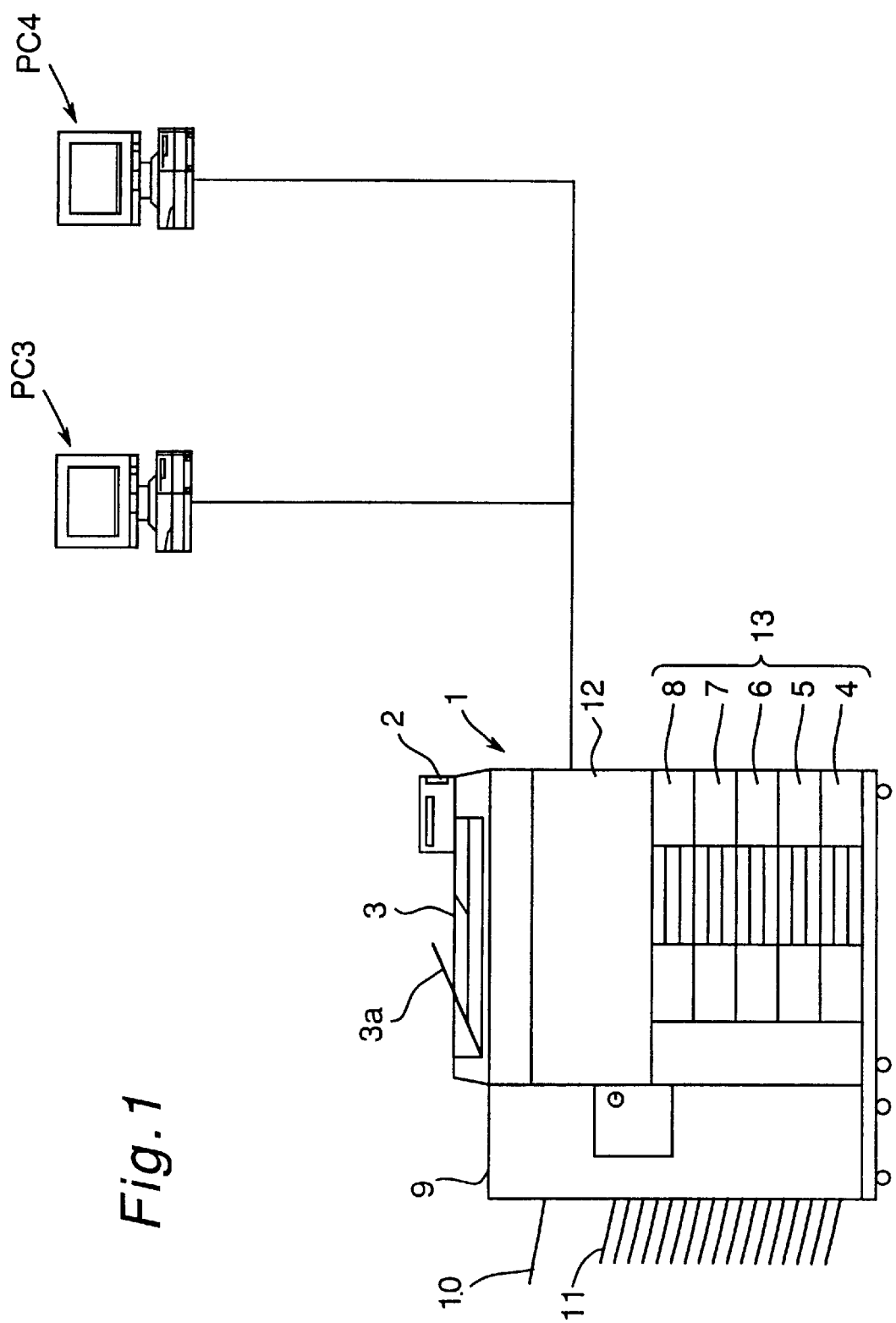
FIG. 1 is a view showing a state in which a copying machine to which an image forming apparatus according to one embodiment of the present invention and two personal computers form a network.

FIG. 1 shows a state in which a copying machine 1 to which an image forming apparatus according to one embodiment is applied and personal computers PC3 and PC4 are forming a network. As described later, the copying machine 1 is allowed to execute a copying operation by transmitting image data from the personal computers PC3 and PC4 to the copying machine 1.

The copying machine 1 is provided with a main body 12, an automatic paper feeding section 13 arranged below this main body 12, an automatic document feeder 3 arranged above the main body 12 and a sorter 9 arranged beside the main body 12. On the automatic document feeder 3 is mounted a copy permitting device 2 that serves as permission controls for outputting a copy permitting device set signal representing permission of a copying operation in accordance with an operation executed by an operator. For the copy permitting device 2, there can be adopted a key counter controller that has a slot for accepting a key counter and outputs the copy permitting device set signal when the key counter for counting copy pagination is mounted in the slot. The copy permitting device 2 may accept a prepaid card instead of the key counter. In this case, the copy permitting device 2 detects a balance of the accepted prepaid card and outputs the copy permitting device set signal so long as the detected balance covers a charge for a copy. It is also allowed to adopt as the copy permitting device 2 a coin vendor that directly accepts cash instead of the prepaid card and outputs the copy permitting device set signal according to the amount of the deposited money or a controller that accepts the input of an ID code and outputs the copy permitting device set signal according to the inputted ID code.

The automatic document feeder 3 automatically supplies one after another original document sheets placed on an original document setting tray 3a onto a platen glass 19 (see FIG. 2) provided on the main body 12.

The automatic paper feeding section 13 possesses five-tiered paper feeder cassettes 4, 5, 6, 7 and 8, and a paper sheet can be supplied from either one of these paper feeder cassettes 4 through 8 into the main body 12.

Figure 3:
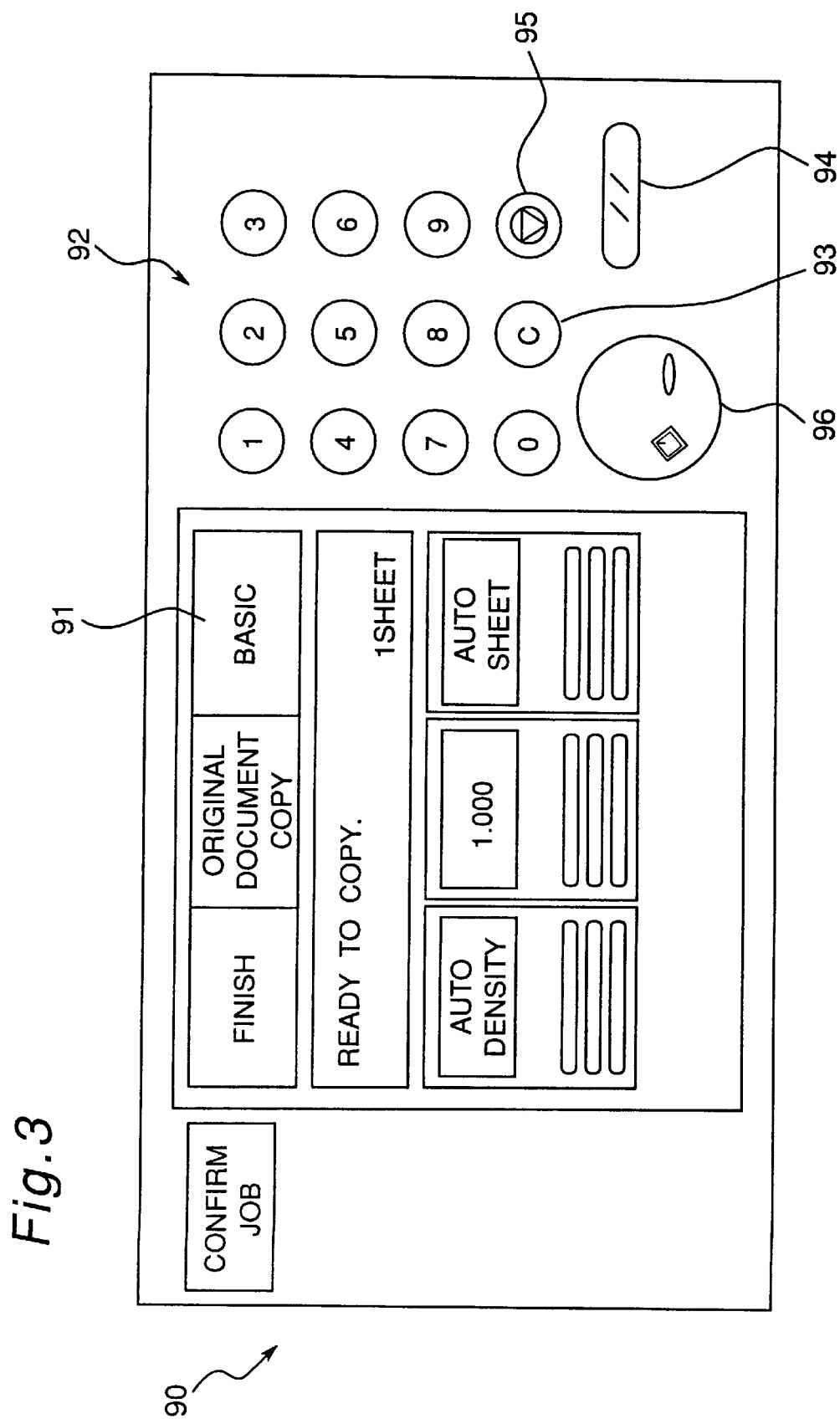
FIG. 3 is a view showing an operation panel of the above copying machine, where a LCD touch panel screen shows a copy-permitted state.

In an upper portion of the main body 12 and before the automatic document feeder 3 is provided an operation panel 90 as shown in FIG. 3. The operation panel 90 is provided with an LCD (Liquid Crystal Display) touch panel 91, ten numerical keys 92 for inputting a setting number and a magnification ratio, a clearing key 93 for putting the setting number back to the standard value of "1" or a similar purpose, a panel reset key 94 for putting a setting value or the like for use in the copying operation back to the standard value, a stop key 95 for stopping the copying operation and a start key 96 for starting the copying operation. When the start key 96 is operated, the automatic document feeder 3 starts its operation to successively supply original document sheets onto the platen glass 19, and the original document sheets are read for the execution of the copying operation of the original document sheets. The LCD touch panel 91 displays a variety of states of the copying machine 1, exemplified by occurrence of jam (paper jam), a service personnel call, copy permission/inhibition information, occurrence of paper emptiness (no paper sheet in the paper feed cassettes), an exposure level, a magnification ratio, a paper sheet finish mode and various kinds of other information, and the panel 91 is able to execute inputting for the selection of an operation mode with a touching operation executed by the operator. The copy permission/inhibition information is information representing whether the copying machine 1 is in a copy-permitted state or a copy-inhibited state. The copy-permitted state means a state in which a copying operation is executed in response to depression of the start key 96 by the operator or transmission of a print request signal from the personal computers PC3 and PC4 to the copying machine 1. The copy-inhibited state means a state in which no copying operation is executed even when the operator depresses the start key 96 or the print request signal is transmitted from the personal computers PC3 and PC4 to the copying machine 1. For example, the operator is informed of the copy-permitted state by displaying the information of "ready to copy" or the like on the screen of the LCD touch panel 91. On the other hand, the operator is informed of the copy-inhibited state by displaying the information of "copy inhibited" or the like on the screen of the LCD touch panel 91.

Figure 2:
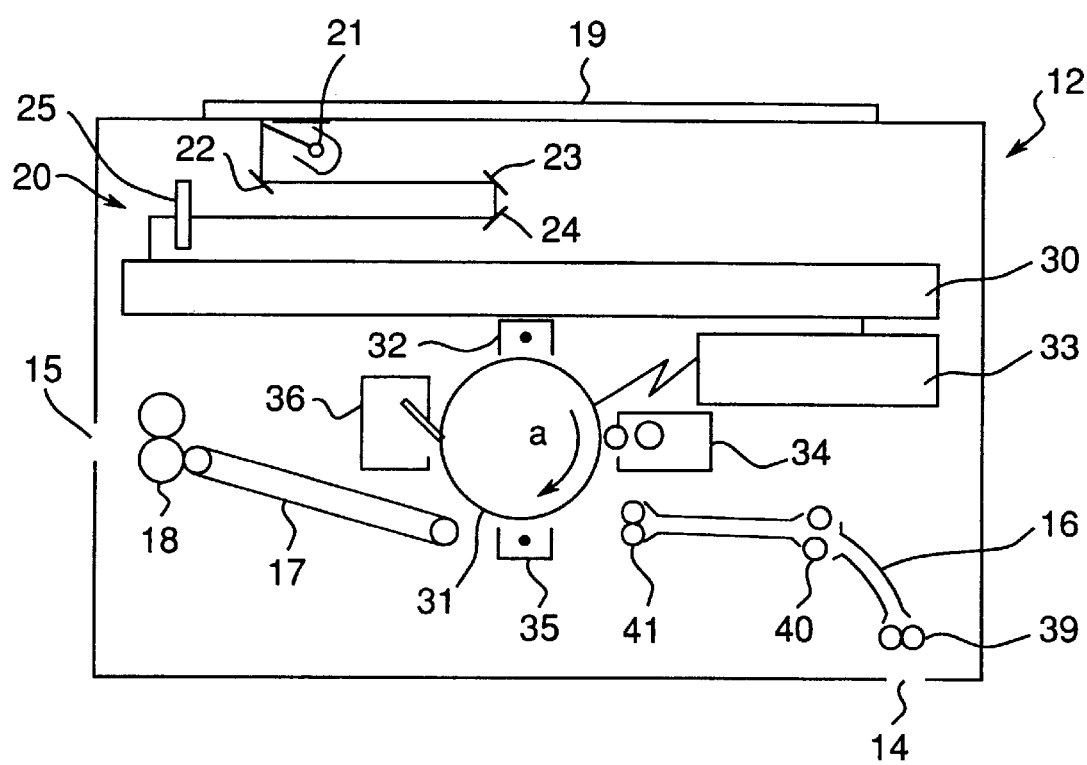
FIG. 2 is a view showing a longitudinal sectional view of the main body of the above copying machine.

As shown in FIG. 2, a photoreceptor drum 31 is provided roughly at the center of the main body 12 while being rotatable in a direction of arrow "a". Around the photoreceptor drum 31 are provided an electric charger 32, a laser scanning optical system 33, a developing unit 34 and a transfer unit 35, which are for executing image formation through an electrophotographic process, a cleaning unit 36 for removing the remaining toner on the photoreceptor and so on. These components constitute an image forming section.

An image scanner section 20 has an exposure lamp 21 for exposing the surface of the original document placed on the platen glass 19, mirrors 22, 23 and 24 for reflecting light from the original document surface and a CCD (Charge Coupled Device) line sensor 25 for converting light obtained via these mirrors into an electric signal. The exposure lamp 21 for exposure use and the mirror 22 which are constituting a first slider scan the original document surface, the mirrors 23 and 24 which are constituting a second slider move at a speed half the speed of the first slider. An output of the CCD line sensor 25 is stored once as image information into an image memory provided inside an image processing circuit 30.

The image information stored in the image processing circuit 30 is transmitted to the laser beam scanning optical system 33 under instructions from a CPU (Central Processing Unit) as described later. A laser beam of light emitted from the laser beam scanning optical system 33 is modulated on the basis of the image information from the image processing circuit 30 and used for exposing the electrically charged photoreceptor drum 31. By this operation, an electrostatic latent image is formed on the photoreceptor drum 31. This latent image is developed by the developing unit 34, so that a toner image is formed on the photoreceptor drum 31.

A paper sheet that has been conveyed from either one of the paper feeder cassettes 4 through 8 via a paper sheet inlet 14 is conveyed to a conveyance path 16 by a vertical conveyance roller 39. In this case, upon confirming the pass of the paper sheet by a sensor (not shown), then the paper sheet is conveyed to a position just before a timing roller 41 by an intermediate roller 40. The paper sheet is once stopped in the position of the timing roller 41 and then conveyed into the transfer unit 35 in synchronization with the image formed on the photoreceptor drum 31. By this operation, the image on the photoreceptor drum 31 is transferred onto the paper sheet. Subsequently, the paper sheet is conveyed into a fixing means 18 by a conveyance belt 17. By this operation, the transferred toner is heated and fixed on the paper sheet. The paper sheet (print) obtained after the fixation is conveyed through a discharge outlet 15 to the sorter 9 (FIG. 1) arranged beside the main body. Then, the print is discharged onto a non-sorting bin 10 or a sorting bin 11 according to a sorting mode that has been preparatorily set via the operation panel 90.

Figure 5:
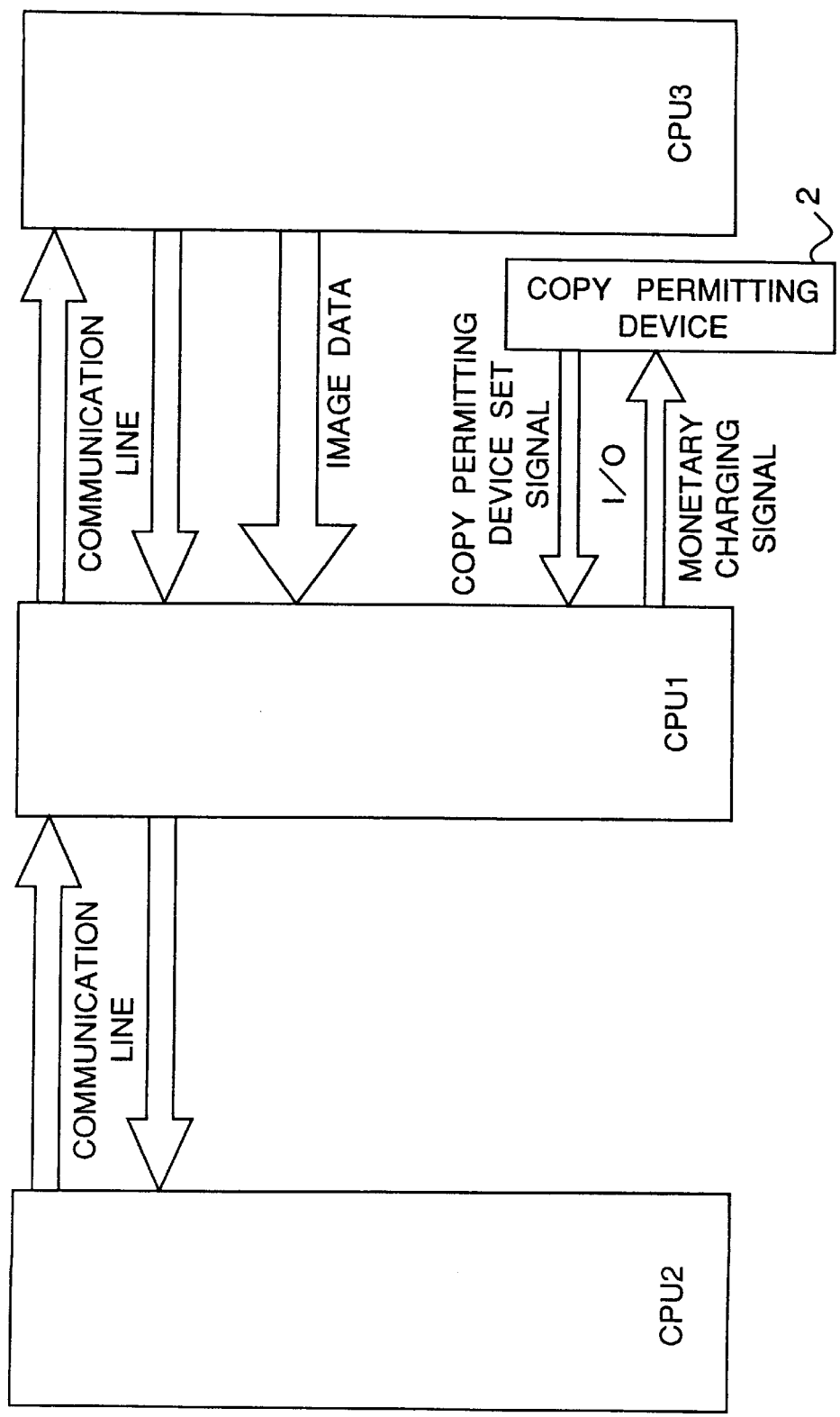
FIG. 5 is a view showing a relation of connection between a CPU1 and a CPU2 of the above copying machine and a CPU3 of a personal computer.

FIG. 5 shows a relation of connection between the CPU1 and CPU2 of this copying machine 1 and the CPU3 of the personal computer PC3. The CPU1 executes processing relevant to the control of the whole system of the copying machine 1 and the display of the operation panel 90, while the CPU2 executes mechanical control of the copying machine 1. The CPU1 and the CPU2 are connected to each other by way of a communication line. The CPU1 receives signals of a discharge report (signal which represents the fact that a print is discharged from the main body 12 and is outputted every time each print is discharged) and so on from the CPU2 by way of this communication line. The CPU1 and the CPU3 are connected to each other by way of a communication line and are also connected to each other by way of a data bus for transmitting image data from the CPU3 to the CPU1. The CPU1 is connected to the copy permitting device 2 via an input/output interface I/O. As described later, a copy permitting device set signal is transmitted from the copy permitting device 2 to the CPU1, while a monetary charging signal is transmitted from the CPU1 to the copy permitting device 2.

(1) A procedure for executing the control of permitting or inhibiting the copying operation of the copying machine 1 on the image data transmitted from the personal computers PC3 and PC4 according to the copy permitting device set signal from the copy permitting device 2 will be described in detail with reference to the flowcharts of FIG. 6 through FIG. 19.

1) For the sake of easy understanding, the operation of the personal computer PC3 will be described first.

Figure 16:
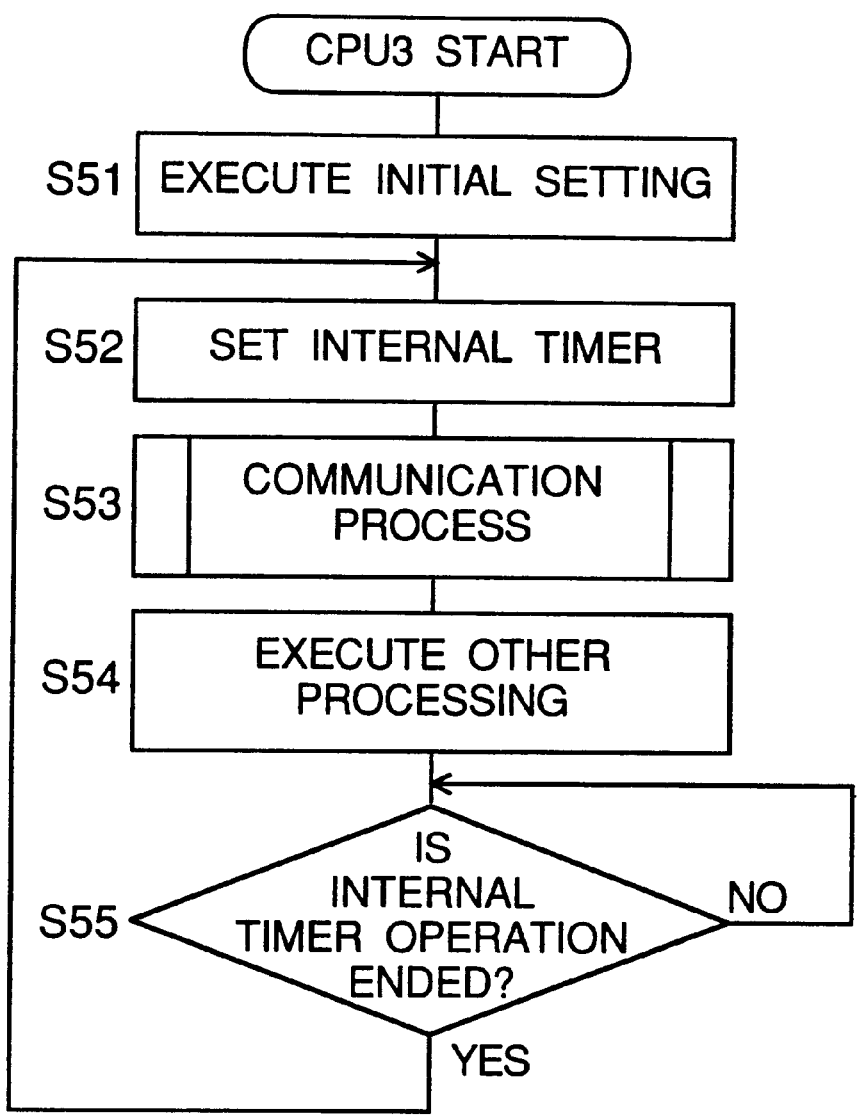
FIG. 16 is a chart showing a schematic flow of a process to be executed by the CPU3 of the above personal computer.

FIG. 16 shows a schematic flow (main routine) of the processing to be executed by the CPU3 of the personal computer PC3.

i) First, initial setting is executed in step S51, and then an internal timer is set in step S52.

ii) Next, in step S53, the CPU3 executes the following communication process with the CPU1 of the copying machine 1.

Figure 17:
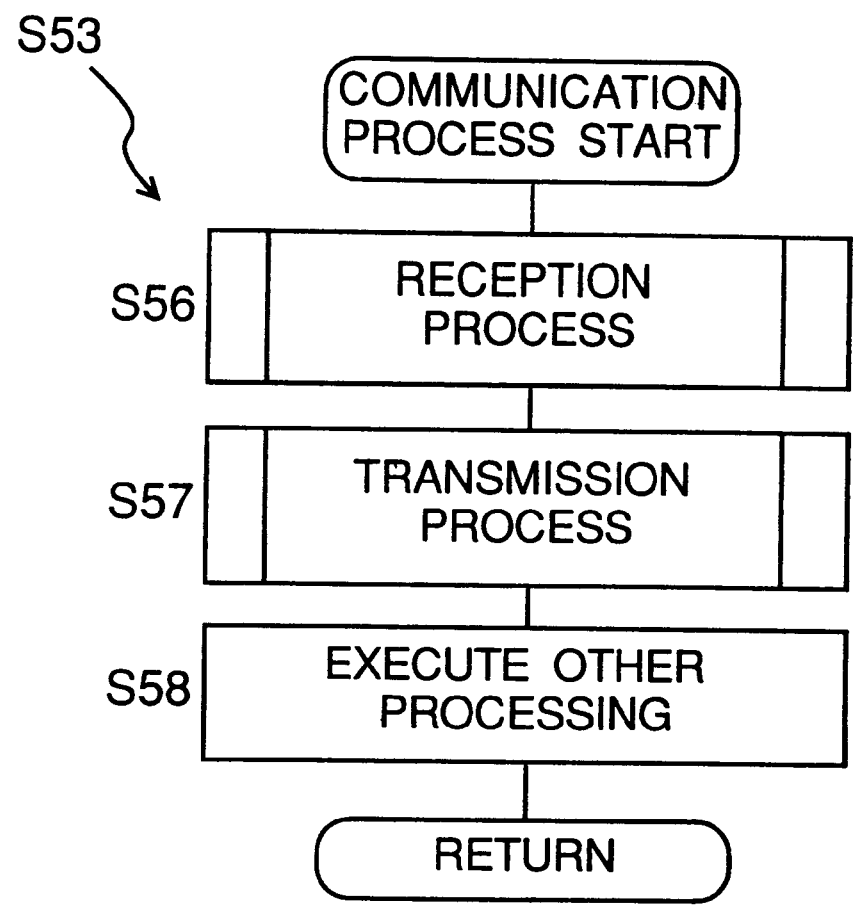
FIG. 17 is a chart showing a communication process flow in FIG. 16.

That is, in this communication process (S53), as shown in FIG. 17, a reception process is executed in step S56, and then a transmission process is executed in step S57.

Figure 18:
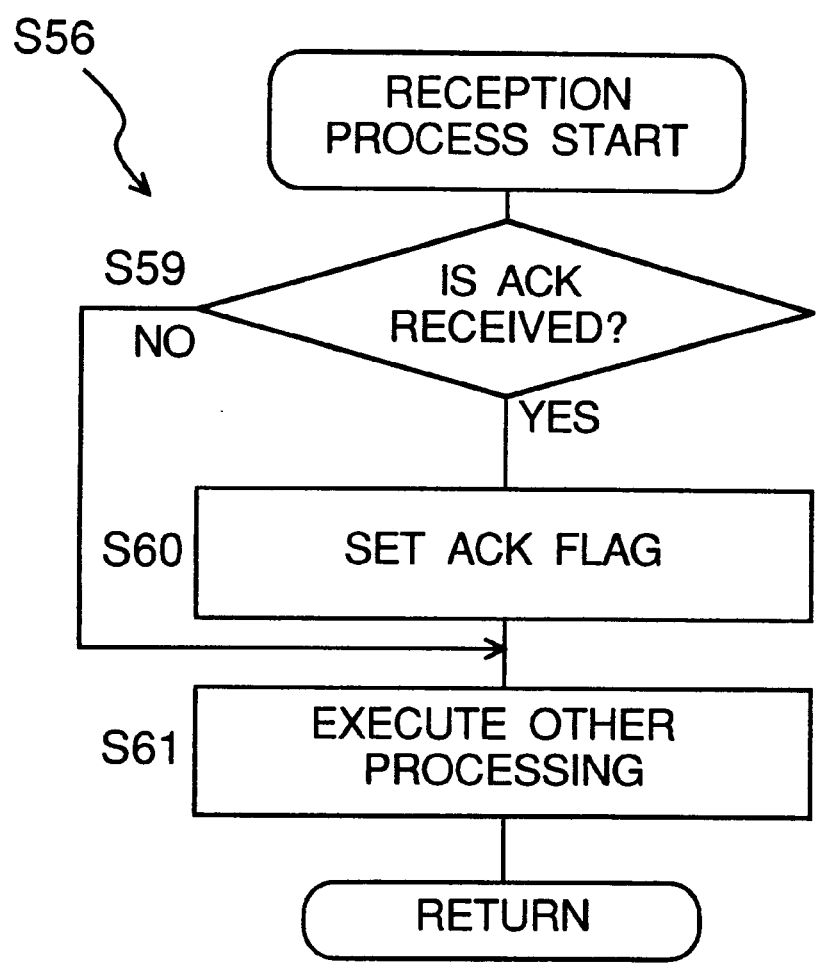
FIG. 18 is a chart showing a reception process flow in FIG. 17.

In detail, in the reception process (S56) as shown in FIG. 18, it is decided in step S59 whether or not an ACK signal (acknowledge signal: representing the fact that the copying machine 1 is in the copy-permitted state) is received. When the ACK signal is received, the program flow proceeds to step S60 to set an ACK flag and then proceeds to step S61 to execute other processing. When the ACK signal is not received in step S59, the program flow proceeds directly to step S61 to execute other processing.

Figure 19:
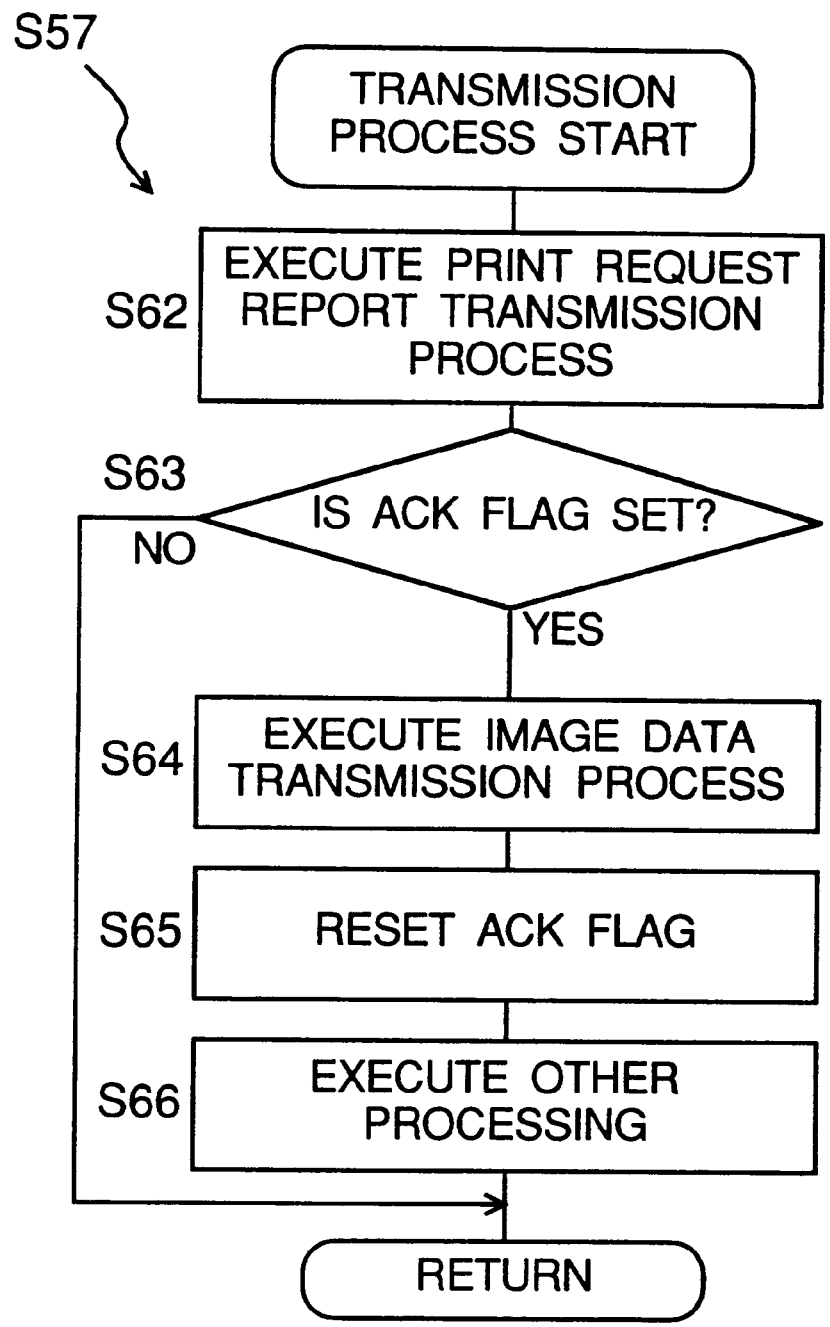
FIG. 19 is a chart showing a transmission process flow in FIG. 17.

In the subsequent transmission process (S57), as shown in FIG. 19, a process for transmitting a print request report to the CPU1 is executed in step S62, and subsequently it is decided in step S63 whether or not the ACK flag is set. When the ACK flag is set, meaning that the copying machine 1 is in the copy-permitted state, a process for transmitting image data from the CPU3 to the CPU1 is executed in step S64. Subsequently, the ACK flag is reset in step S65. Then, other processing is executed in step S66, and thereafter the program flow proceeds to step S58 shown in FIG. 17. When the ACK flag is not set in step S63, meaning that the copying machine 1 is in the copy-inhibited state, the image data transmission process is not executed, and the program flow proceeds directly to step S58 shown in FIG. 17.

In step S58 shown in FIG. 17, other processing is executed.

iii) Next, the other processing is executed in step S54 shown in FIG. 16. Finally, waiting for the end of the internal timer in step S55, the program flow returns to step S52.

2) The operation of the copying machine 1 will be described next.

Figure 6:
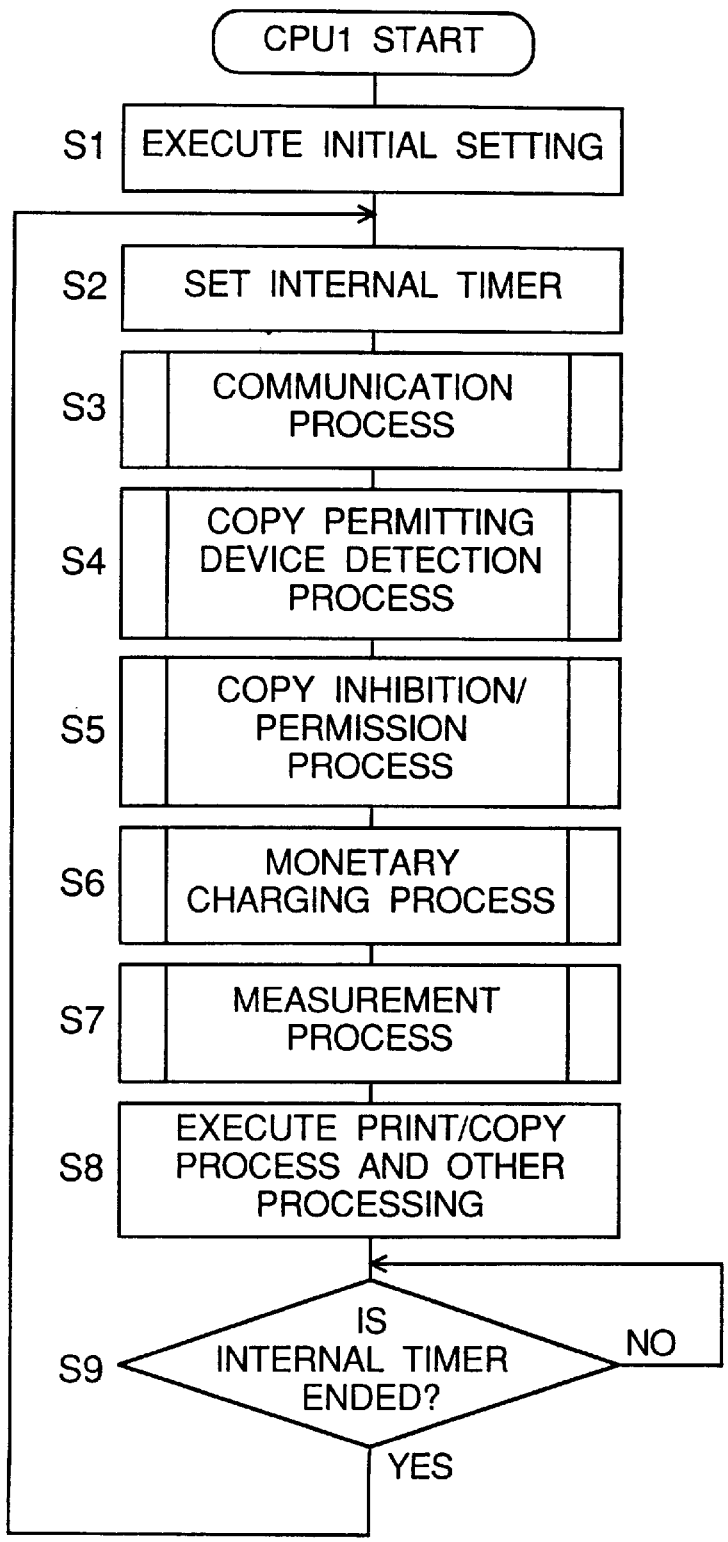
FIG. 6 is a chart showing a schematic flow of processing to be executed by the CPU1 of the above copying machine.

FIG. 6 shows a schematic flow (main routine) of a process to be executed by the CPU1 of the copying machine 1.

i) First, initial setting is executed in step S1, and then the internal timer is set in step S2.

ii) Next, in step S3, the CPU1 executes the following communication process with the CPU3 of the personal computer PC3.

Figure 7:
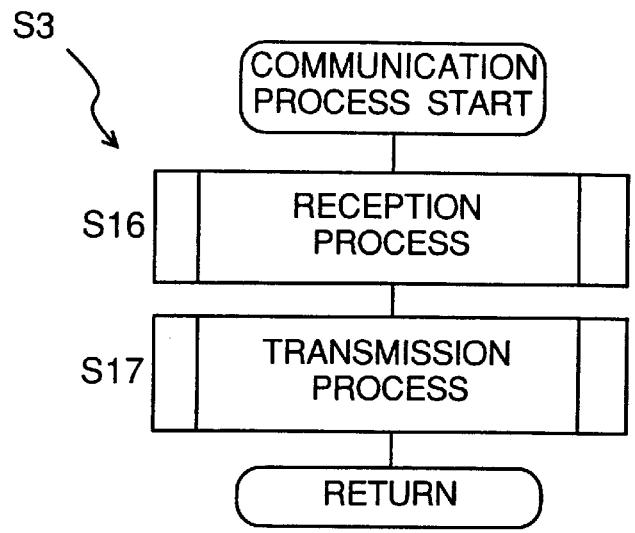
FIG. 7 is a chart showing a communication process flow in FIG. 6.

That is, in this communication process (S3), as shown in FIG. 7, the reception process is executed in step S16, and then a transmission process is executed in step S17.

Figure 8:
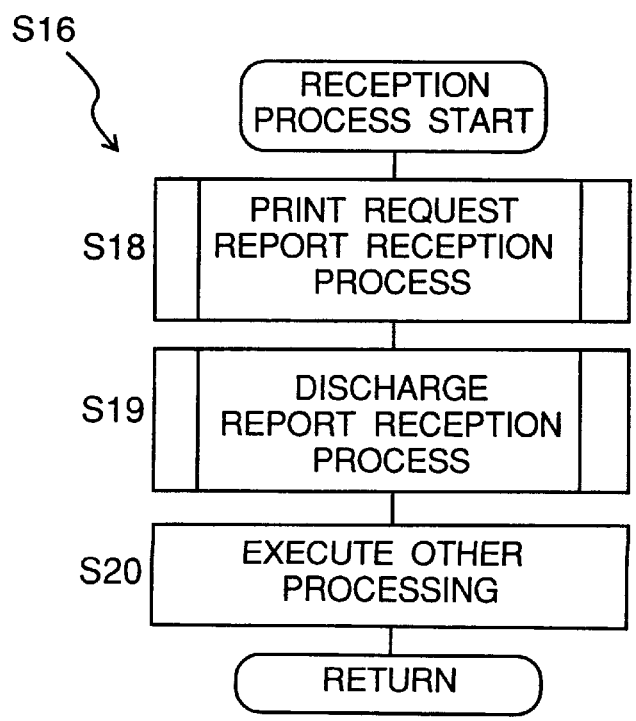
FIG. 8 is a chart showing a reception process flow in FIG. 7.
Figure 10:
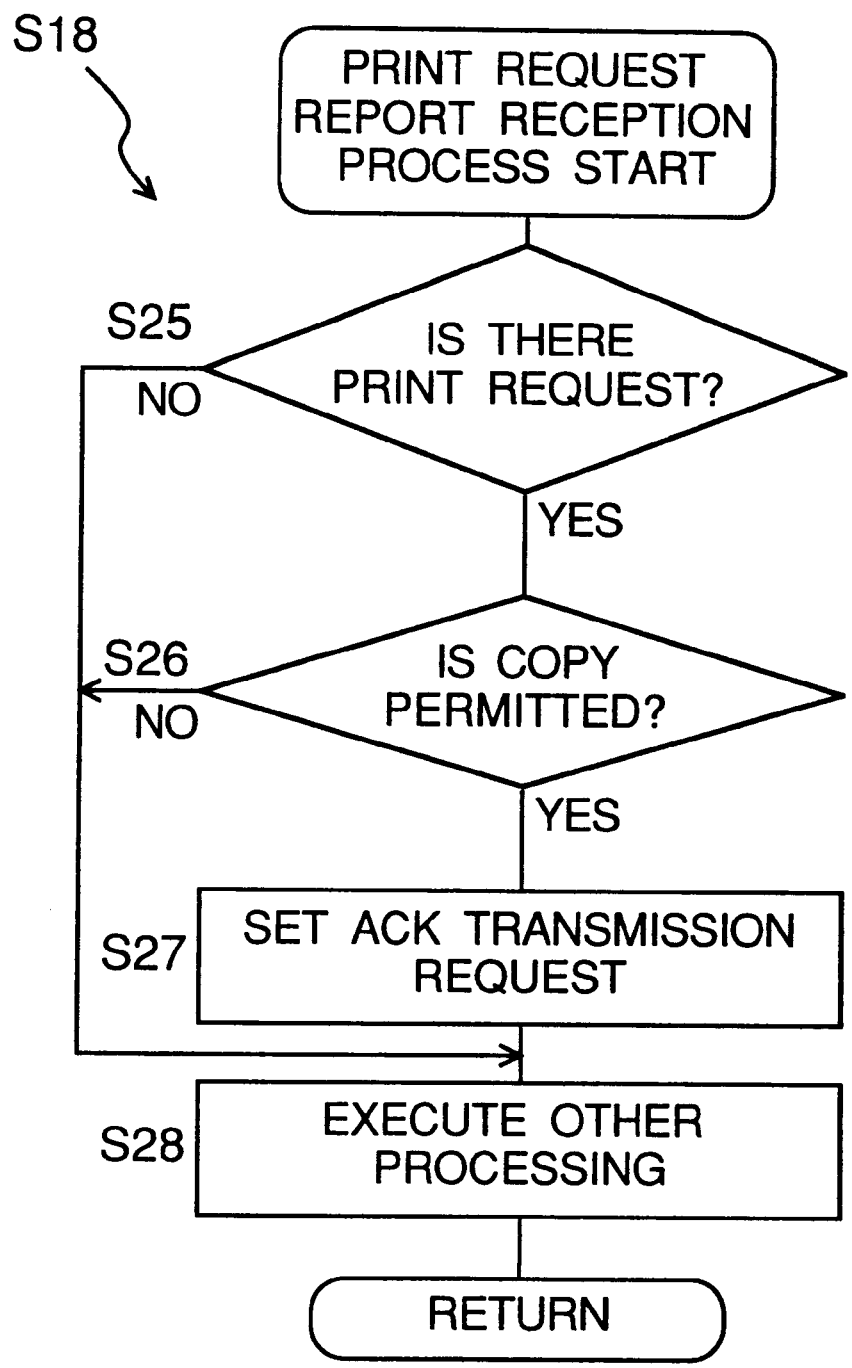
FIG. 10 is a chart showing a print request report reception process flow in FIG. 8.
Figure 11:
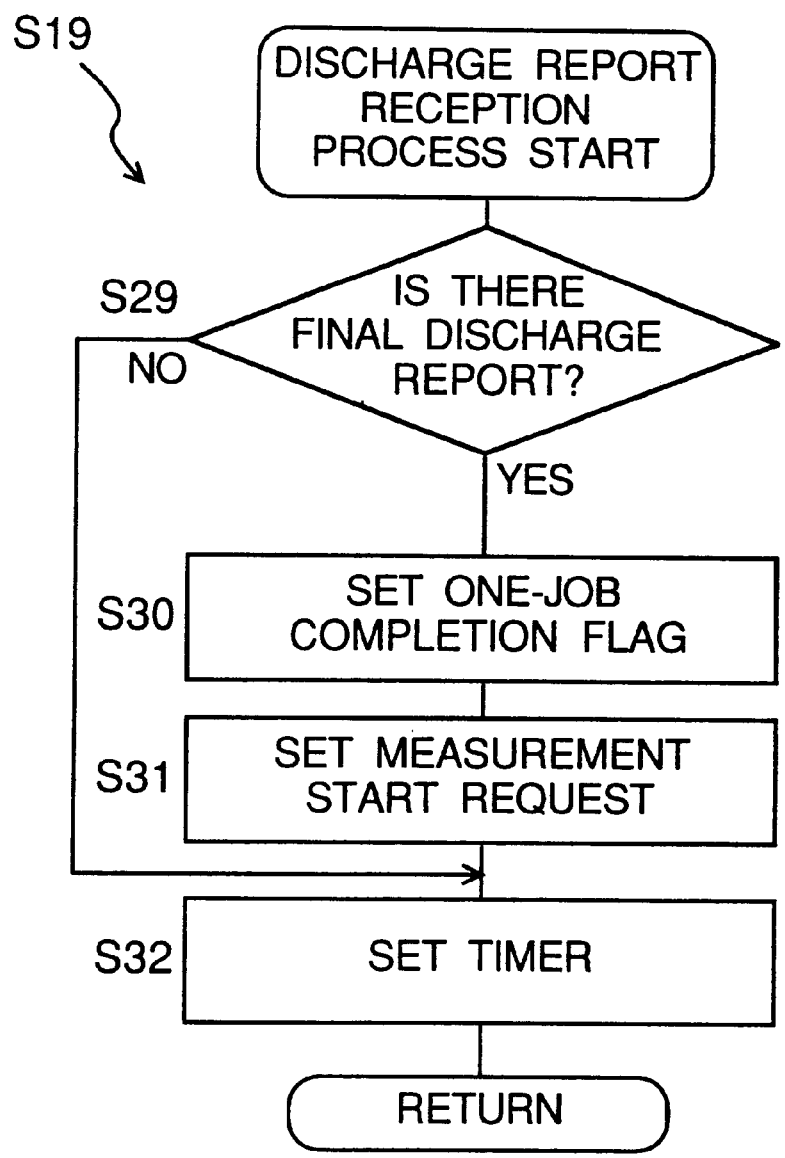
FIG. 11 is a chart showing a discharge report reception process flow in FIG. 8.

In detail, in the reception process (step S16) as shown in FIG. 8, a print request report reception process is executed in step S18, and then a discharge report reception process is executed in step S19. The print request report reception process in step S18 is executed by print request controls. In the print request report reception process (S18) as shown in FIG. 10, it is decided whether or not a print request report is received from the CPU3. When the print request report is received, the program flow further proceeds to step S26 to decide whether or not the copying machine 1 is in the copy-permitted state. When the copying machine 1 is in the copy-permitted state, an ACK transmission request is set in step S27, and then other processing is executed in step S28. When no print request report is received from the CPU3 in step S25 or when the copying machine 1 is in the copy-inhibited state in step S26, the ACK transmission request is not set, and the program flow proceeds directly to step S28 to execute other processing. In the subsequent discharge report reception process (S19) as shown in FIG. 11, it is decided in step S29 whether or not the discharge report of one job from the CPU2 is the final one (final discharge report). When the discharge report is the final discharge report, meaning that the job is completed, a one-job completion flag is set in step S30. Subsequently, a measurement start request (requesting the start of timer counting) in step S31, and after setting the timer in step S32, the program flow proceeds to step S20 shown in FIG. 8. When the discharge report is not the final discharge report in step S29, neither the setting of the measurement start request nor the setting of the timer is executed, and the program flow proceeds directly to step S20 shown in FIG. 8. In step S20 shown in FIG. 8, the other processing is executed.

Figure 9:
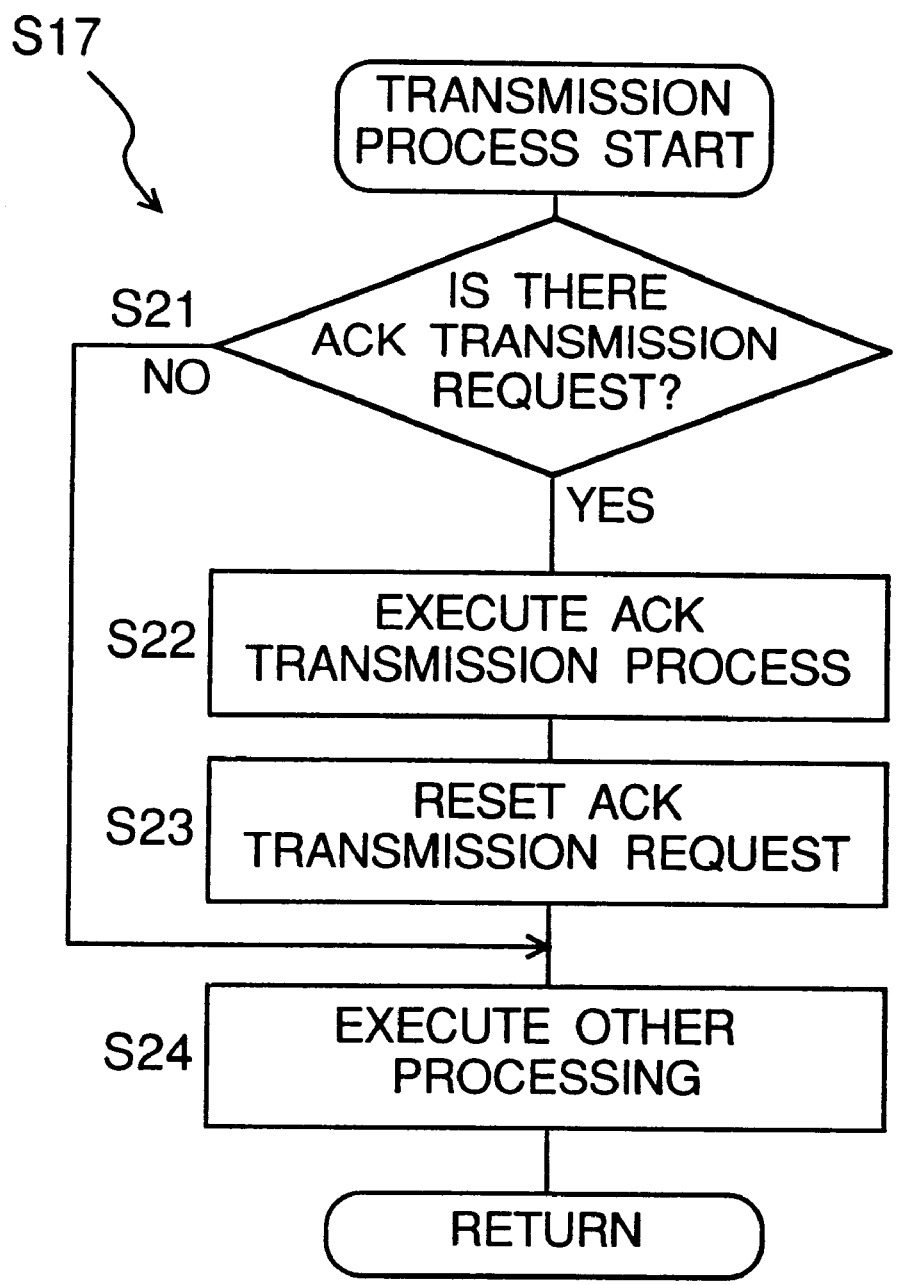
FIG. 9 is a chart showing a transmission process flow in FIG. 7.

In the subsequent transmission process (S17) as shown in FIG. 9, it is decided in step S21 whether or not the ACK transmission request is set. When the ACK transmission request is set, the program flow proceeds to step S22 to execute the transmission process of the ACK signal. Subsequently, the ACK transmission request is reset in step S23, and the other processing is executed in step S24. When the ACK transmission request is not set in step S21, the ACK signal transmission process is not executed, and the program flow proceeds directly to step S24 to execute other processing.

iii) Next, a copy permitting device detection process is executed in step S4 shown in FIG. 6.

Figure 12:
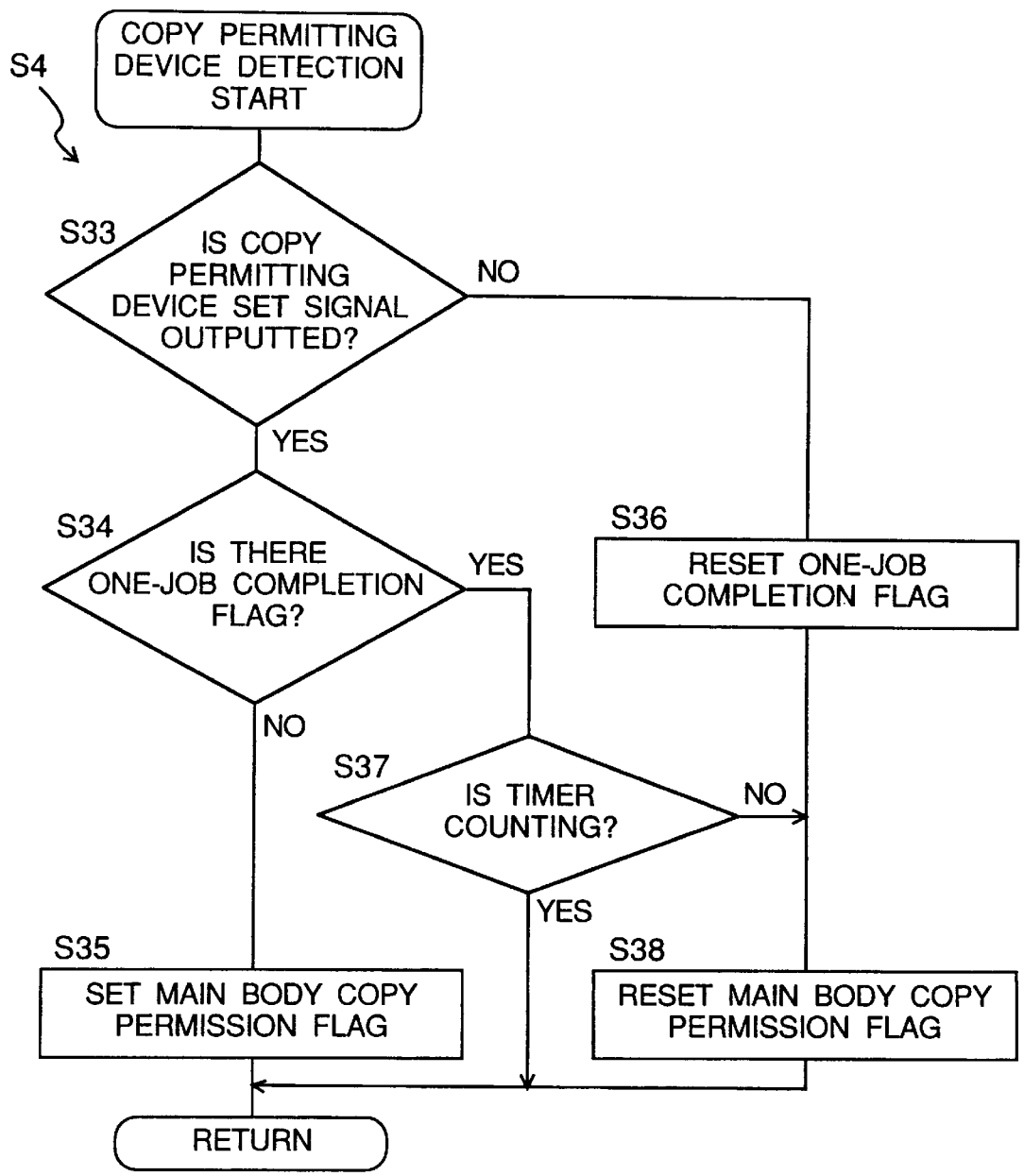
FIG. 12 is a chart showing a copy permitting device detection process flow in FIG. 6.

In detail, as shown in FIG. 12, it is decided in step S33 whether or not a copy permitting device set signal is outputted from the copy permitting device 2. When the copy permitting device set signal is outputted, the program flow proceeds to step S34 to decide whether or not the one-job completion flag is set. When the one-job completion flag is not set, meaning that the job is being executed or before being executed, the program flow proceeds to step S35 to set a main body copy permission flag. When the one-job completion flag is set in step S34, the job has already been completed. In this case, the program flow proceeds to step S37 to decide whether or not the timer is counting, i.e., whether or not a measurement start request is set. When the timer is not counting, the main body copy permission flag is reset, and the program flow proceeds to step S5 shown in FIG. 6. When the timer is counting, the job has already been completed. However, in order to maintain the copy-permitted state of the copying machine 1 for a specified period of time (timer setting period in step S32) after the completion of the job, the program flow proceeds directly to step S5 shown in FIG. 6.

Therefore, the copy-permitted state of the copying machine 1 is maintained for the specified period of time after the completion of the job by the copy inhibition/permission process in step S5 as described below, and subsequently the copying machine 1 is brought into the copy-inhibited state.

When the copy permitting device set signal is not outputted in step S33, meaning that the operator has reset the copy permitting device, the program flow proceeds to step S36 to reset the one-job completion flag and further reset the main body copy permission flag in step S38, and the program flow proceeds to step S5 shown in FIG. 6.

As is understood from the above, if the operator executes a specified operation on the copy permitting device 2 to bring the copying machine 1 into the copy-permitted state, then a copying operation of only one job is permitted unless the operator executes resetting. Specifically, for example, if the operator inserts a key counter into the slot of the copy permitting device 2 to bring the copying machine 1 into the copy-permitted state, then the copying operation of only one job is permitted unless the operator pulls the key counter out of the slot.

iv) Next, the copy inhibition/permission process is executed in step S5 shown in FIG. 6.

Figure 4:
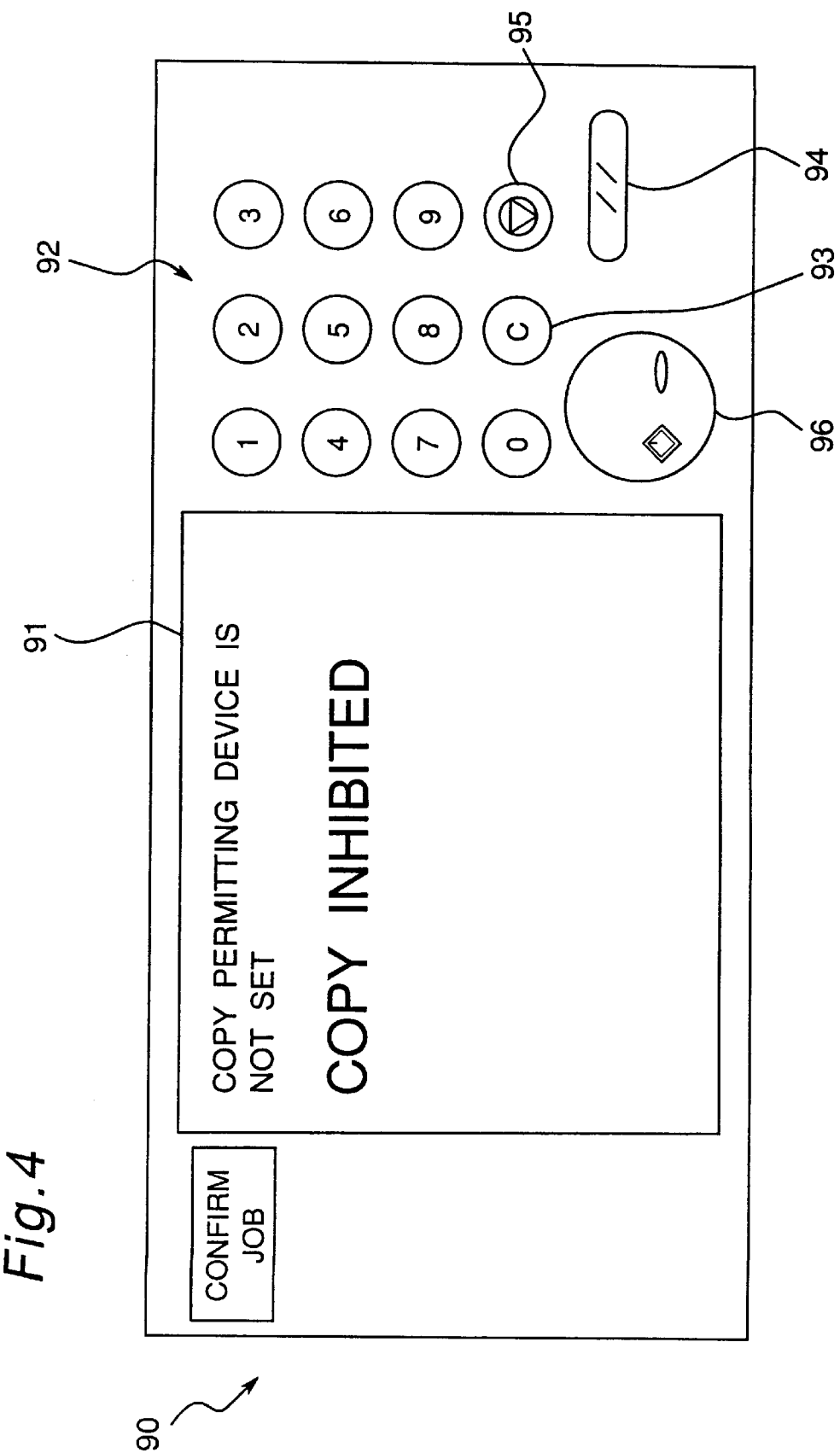
FIG. 4 is a view showing the operation panel of the above copying machine, where the LCD touch panel screen shows a copy-inhibited state.
Figure 13:
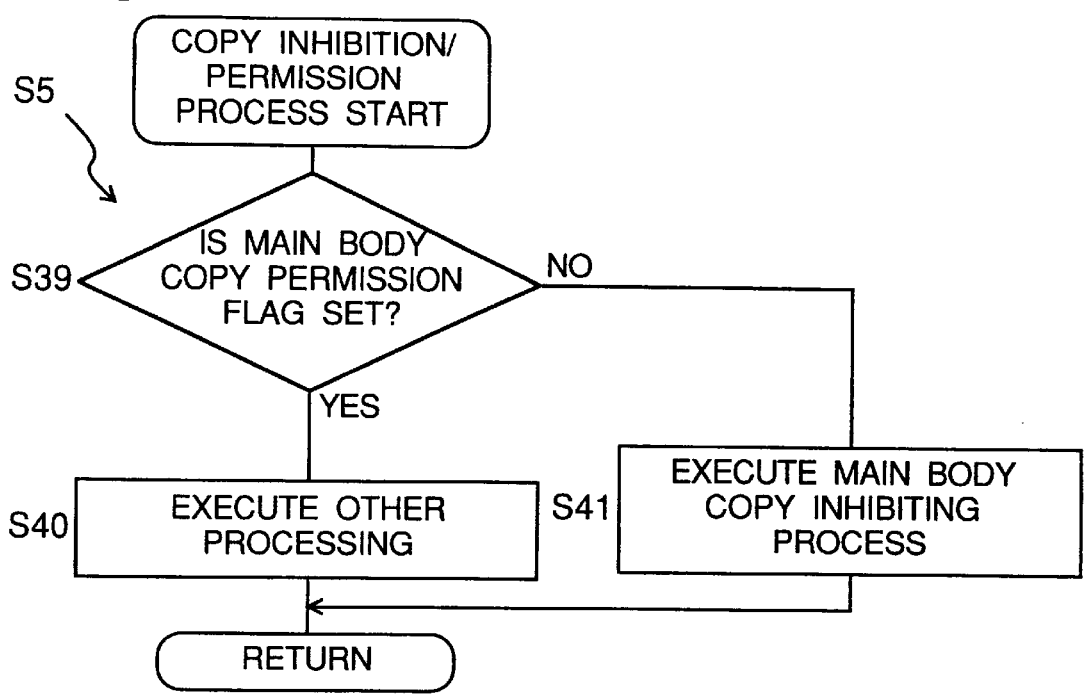
FIG. 13 is a chart showing a copy inhibition/permission process flow in FIG. 6.

In detail, as shown in FIG. 13, it is decided in step S39 whether or not the main body copy permission flag is set. When the main body copy permission flag is set, the program flow proceeds to step S40 to execute other processing. When the main body copy permission flag is not set in step S39, the program flow proceeds to step S41 to execute a main body copy inhibiting process. This main body copy inhibiting process is a process for keeping the copying machine 1 in the copy-inhibited state until the copy permitting device is set again and displaying the information of "copy inhibited" or the like on the screen of the LCD touch panel 91 as shown in FIG. 4.

The steps S4 and S5 are executed by inhibition controls.

v) Next, a monetary charging process is executed in step S6 shown in FIG. 6.

Figure 14:
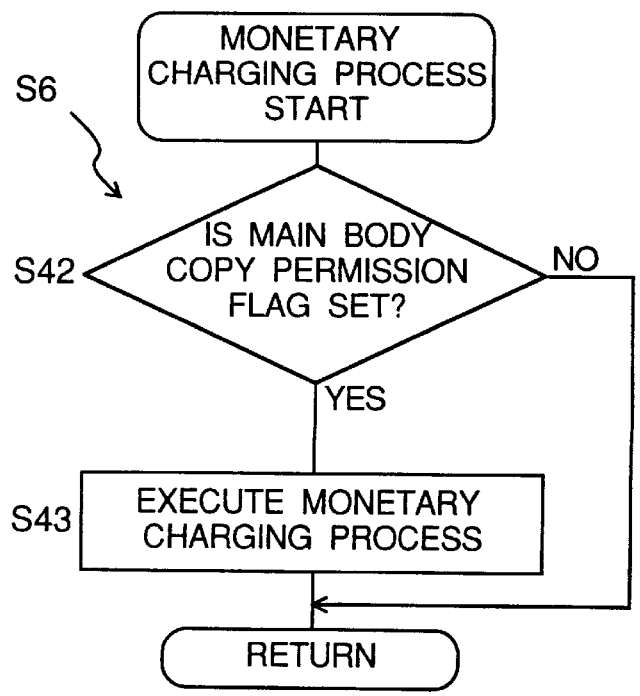
FIG. 14 is a chart showing a monetary charging process flow in FIG. 6.

In detail, as shown in FIG. 14, it is decided in step S42 whether or not the main body copy permission flag is set. When the main body copy permission flag is set, the program flow proceeds to step S43 to execute the monetary charging process. This monetary charging process is a process for executing monetary charging by transmitting a monetary charging signal from the CPU1 to the copy permitting device. For example, when the copy permitting device is a prepaid card, there is executed a process for deducting the number of degrees of use by the monetary charging signal. If the copy permitting device is a coin vendor, there is executed a process for deducting the deposited amount of money by the monetary charging signal. When the main body copy permission flag is not set in step S42, no monetary charging is executed, and the program flow proceeds directly to step S7 shown in FIG. 6.

Consequently, only the one job after the copy permitting device is set by the operator is monetarily charged. Although a job is accepted from an external device such as another personal computer PC4 (FIG. 1) for a specified time after the completion of one job, the set copy permitting device is not monetarily charged for the job.

iv) Next, a measurement process is executed in step S7 shown in FIG. 6.

Figure 15:
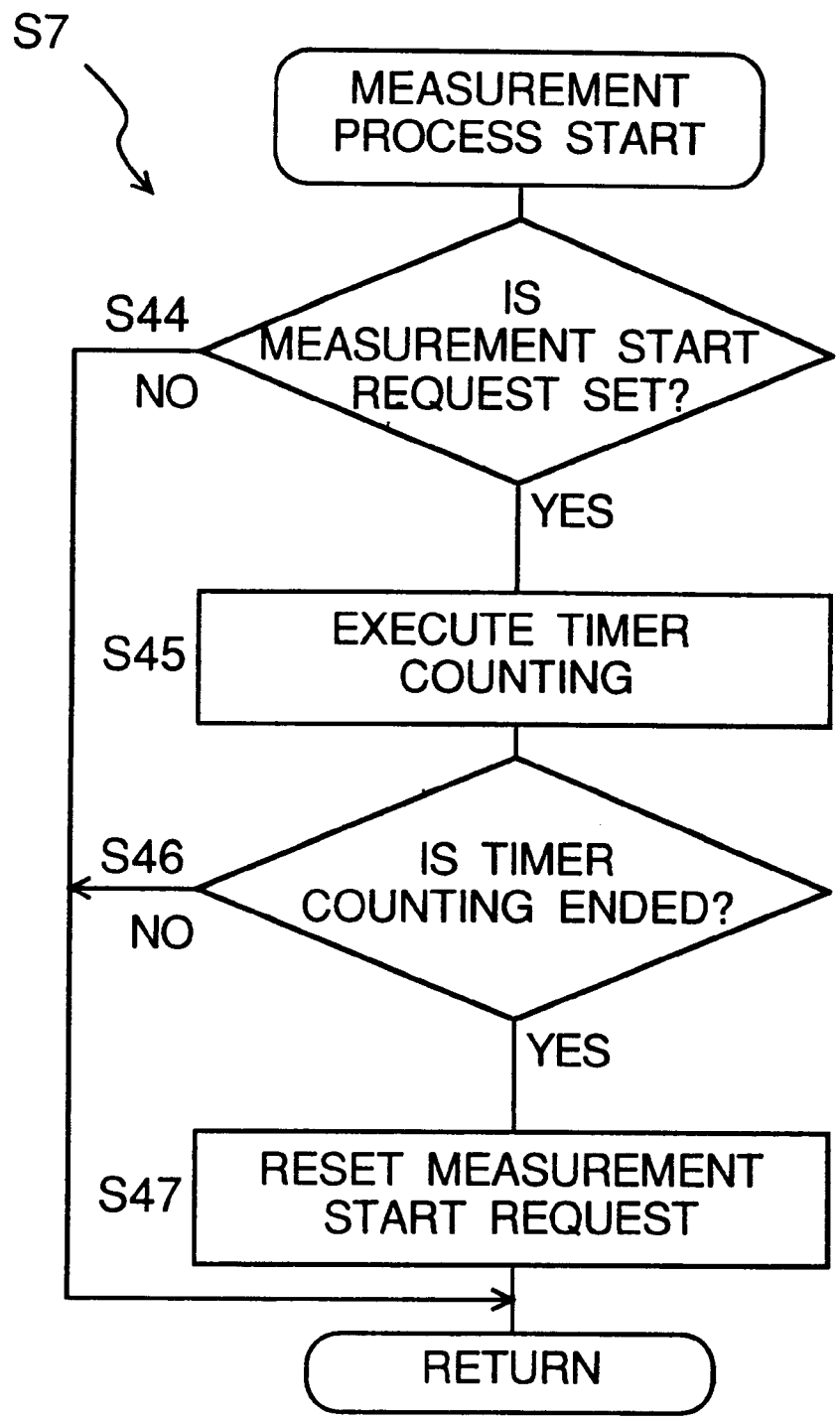
FIG. 15 is a chart showing a measurement process flow in FIG. 6.

In detail, as shown in FIG. 15, it is decided in step S44 whether or not a measurement start request is set. When the measurement start request is set, the program flow proceeds to step S45 to execute timer counting, and it is decided in step S46 whether or not the timer counting is ended. When the timer counting is ended, the measurement start request is reset in step S47, and thereafter the program flow proceeds to step S8 shown in FIG. 6. When the measurement start request is not set in step S44 or when the timer counting is not ended in step S46, the program flow proceeds directly to step S8 shown in FIG. 6.

Therefore, within the specified period of time (timer setting period in step S32) after the completion of one job, the next job can be accepted.

vii) Next, a print/copy process and other processing are executed in step S8 shown in FIG. 6.

It is to be noted that the steps S4 and S8 are executed by print controls.

Finally, waiting for the end of the internal timer in step S9, the program flow returns to step S2.

It is to be noted that the setting of various timers in the copying machine 1 is executed using the time unit of this one routine.

After the copy permitting device is thus set, the copying operation of only one job can be executed. Even in the state in which the copy permitting device is set, the copying operation can be inhibited after the elapse of the specified period of time (timer setting period in step S32) after the completion of one job. Therefore, even if the operator forgets to reset the copy permitting device, then the opportunistic use of the copying machine 1 by another person by means of the copy permitting device can be prevented. Although the job from the external device is accepted within the specified period of time after the completion of one job, the set copy permitting device is allowed to be not monetarily charged.

Although the personal computers PC3 and PC4 are connected to the copying machine 1 in this example, the present invention is not limited to this. It is allowed to connect a variety of devices for executing image formation by externally transmitting image data to the copying machine 1 from, for example, a facsimile.

Assuming that an error such as jam or paper emptiness is detected during the execution of a job and another person restores the same, then only the job is executed, and subsequently the copying operation is inhibited after the elapse of the specified time.

(2) A second embodiment will be described next. This second embodiment differs from the aforementioned embodiment in terms of the copying operation permission/inhibition control. Specifically, in the aforementioned embodiment, the copying operation of the copying machine 1 on the image data transmitted from the personal computers PC3 and PC4 is controlled to be permitted or inhibited according to the copy permitting device set signal from the copy permitting device 2. In contrast to this, in the second embodiment, the permission or inhibition of the original document copying operation to be executed is controlled by the operation from the start key 96, and the copying operation from the personal computer is always permitted.

Therefore, the point different from the aforementioned first embodiment will be described below, and no description will be provided for the common components. The second embodiment adopts a copy permitting device 2 that accepts a key counter, however, it is also allowed to adopt the aforementioned other form. FIG. 20 through FIG. 27 show flowcharts showing a control procedure to be executed by the CPU1 of the copying machine 1 in the present second embodiment.

Figure 20:
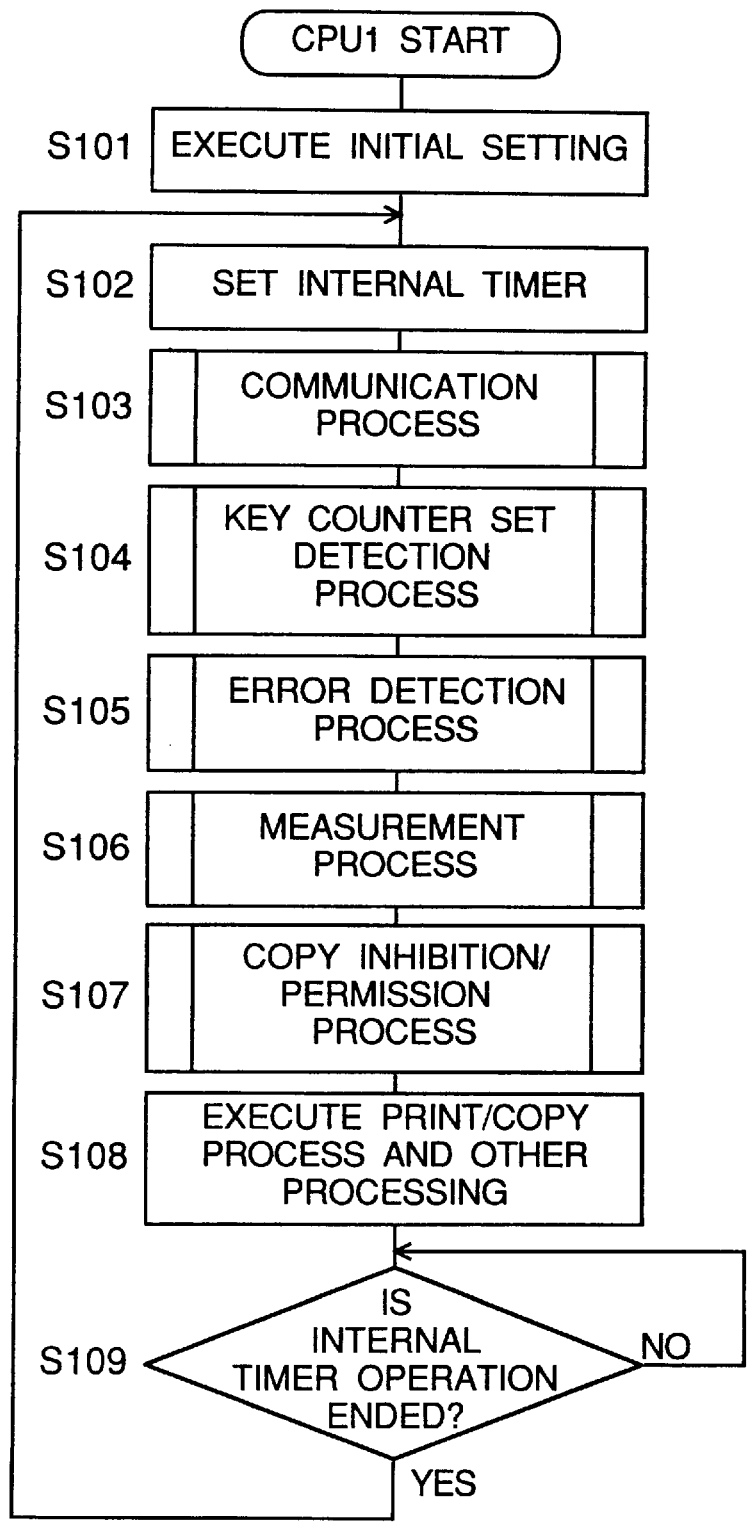
FIG. 20 is a chart showing another schematic flow of a process to be executed by the CPU1 of the above copying machine.

FIG. 20 shows a schematic flow (main routine) of a process to be executed by the CPU1 of the copying machine 1.

i) First, initial setting is executed in step S101, and then the internal timer is set in step S102.

ii) Next, the CPU1 executes the following communication process in step S103.

Figure 21:
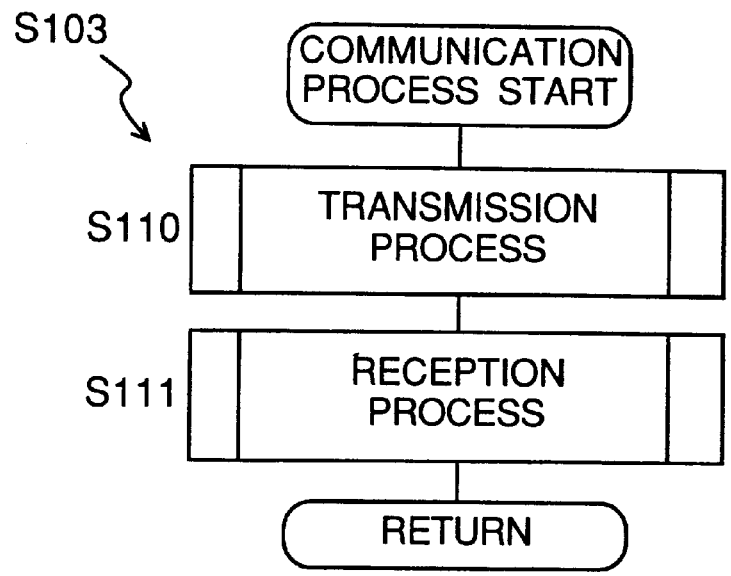
FIG. 21 is a chart showing a communication process flow in FIG. 20.

That is, in this communication process (S103), a transmission process is executed in step S110 and a reception process is subsequently executed in step S111 as shown in FIG. 21.

In detail, in the transmission process (S110), no transmission to the external device is executed, and other processing is executed.

Figure 22:
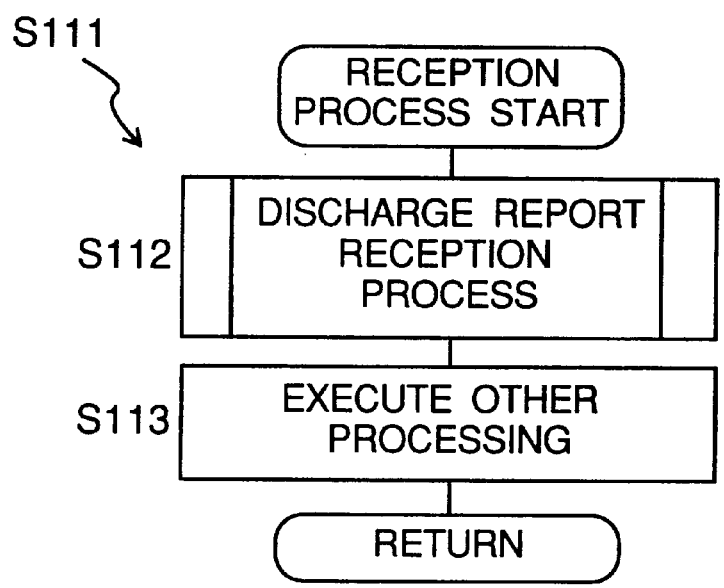
FIG. 22 is a chart showing a reception process flow in FIG. 21.
Figure 23:
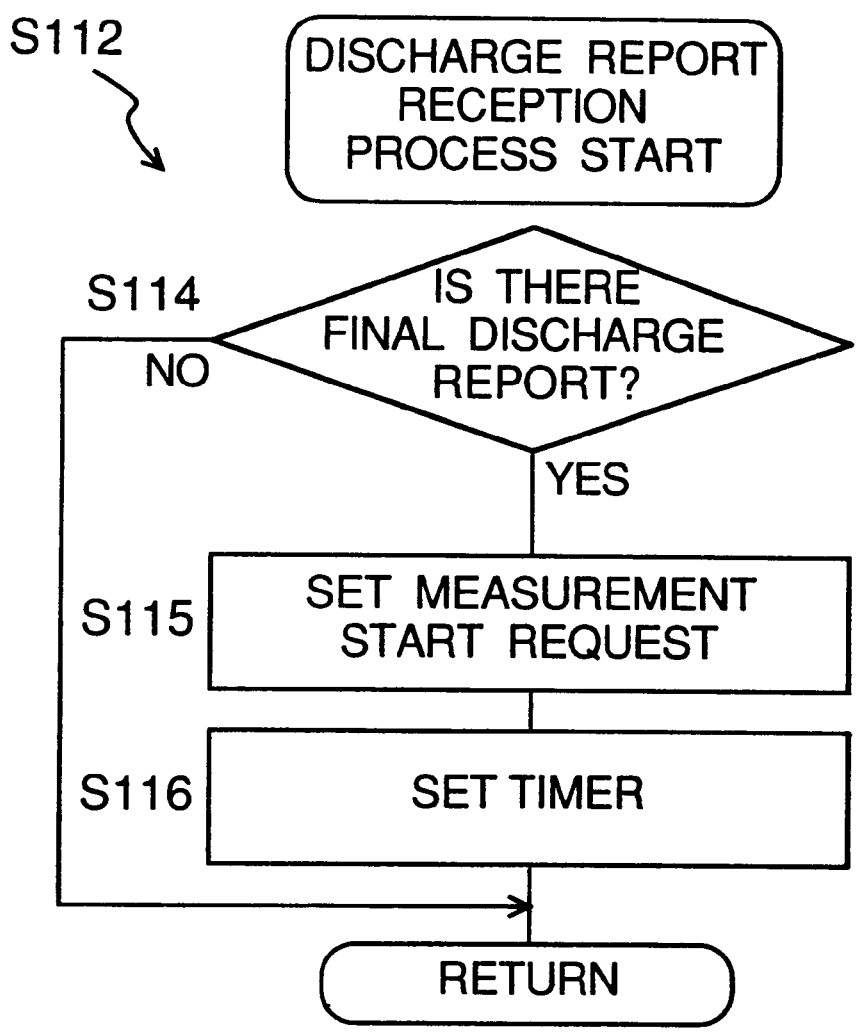
FIG. 23 is a chart showing a discharge report reception process flow in FIG. 22.

In the subsequent reception process (S111), a discharge report reception process is first executed in step S112 as shown in FIG. 22. In this discharge report reception process (S112), it is decided in step S114 whether or not the discharge report of one job from the CPU2 is the final one (final discharge report). When the discharge report is the final discharge report, meaning that the job is completed, a measurement start request (requesting timer count start) is set in step S115, and after setting the timer in step S116, the program flow proceeds to step S113 shown in FIG. 22. When the discharge report is not the final discharge report in step S114, neither the setting of the measurement start request nor the setting of the timer is executed, and the program flow proceeds directly to step S113 shown in FIG. 22. In step S113 shown in FIG. 22, other processing is executed.

iii) Next, a key counter set detection process is executed in step S104 shown in FIG. 20.

Figure 24:
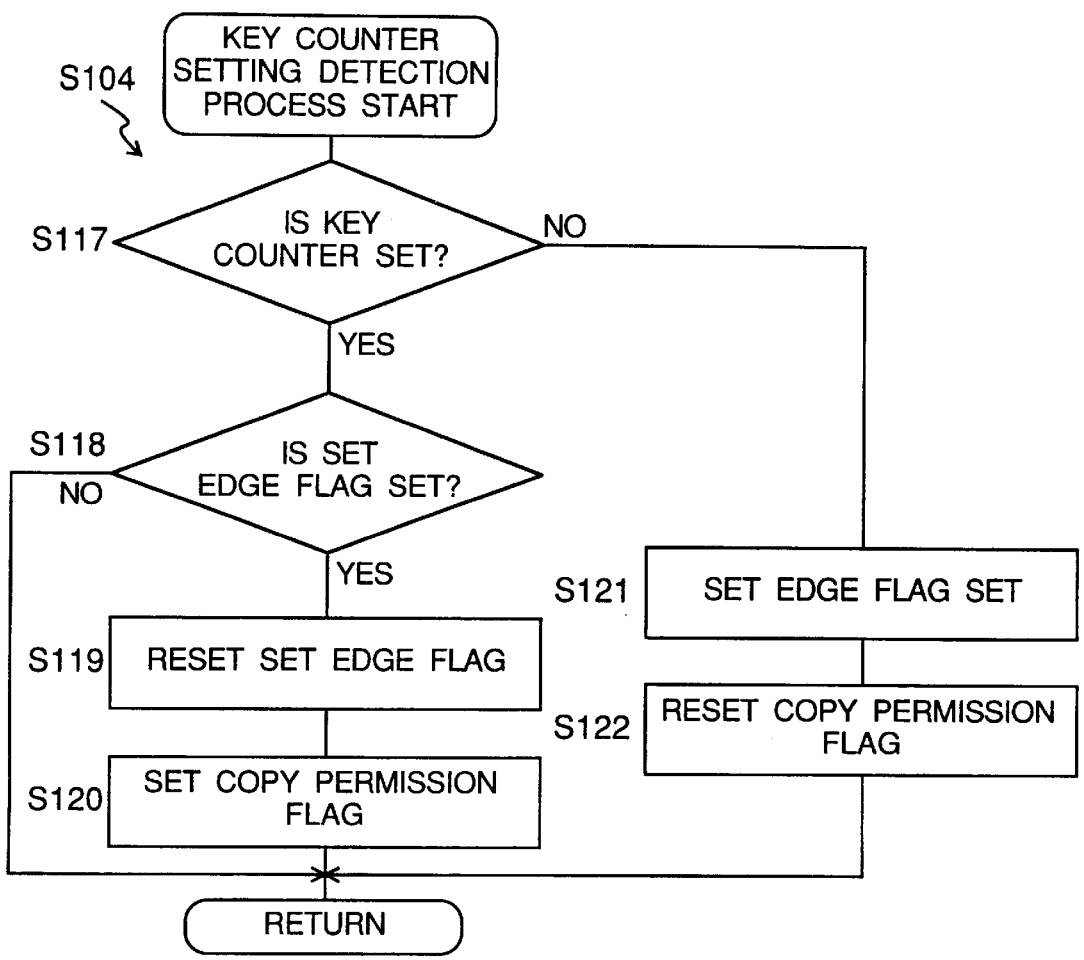
FIG. 24 is a chart showing a key counter set detection process in FIG. 20.

In detail, as shown in FIG. 24, it is decided whether or not the key counter is set in step S117. When the key counter is set, the program flow proceeds to step S118 to decide whether or not a set edge flag is set. When the set edge flag is set, the program flow proceeds to step S119 to reset the set edge flag and further set a copy permission flag in step S120, and the program flow proceeds to step S105 shown in FIG. 20. When the set edge flag is not set in step S118, the program flow proceeds directly to step S105 shown in FIG. 20. When the key counter is not set in step S117, the program flow proceeds to step S121 to set the set edge flag and subsequently reset the copy permission flag in step S122, and the program flow proceeds to step S105 shown in FIG. 20.

Therefore, when the key counter is continuously kept set, the copy permission flag is set only by the key counter set detection in the first time, and the copy permission flag is not set by the key counter set detection in the second and subsequent times. However, when the operator once pulls out the key counter and sets the key counter again, the copy permission flag is set by the subsequent first key counter set detection.

iv) Next, an error detection process is executed in step S105 shown in FIG. 20.

Figure 25:
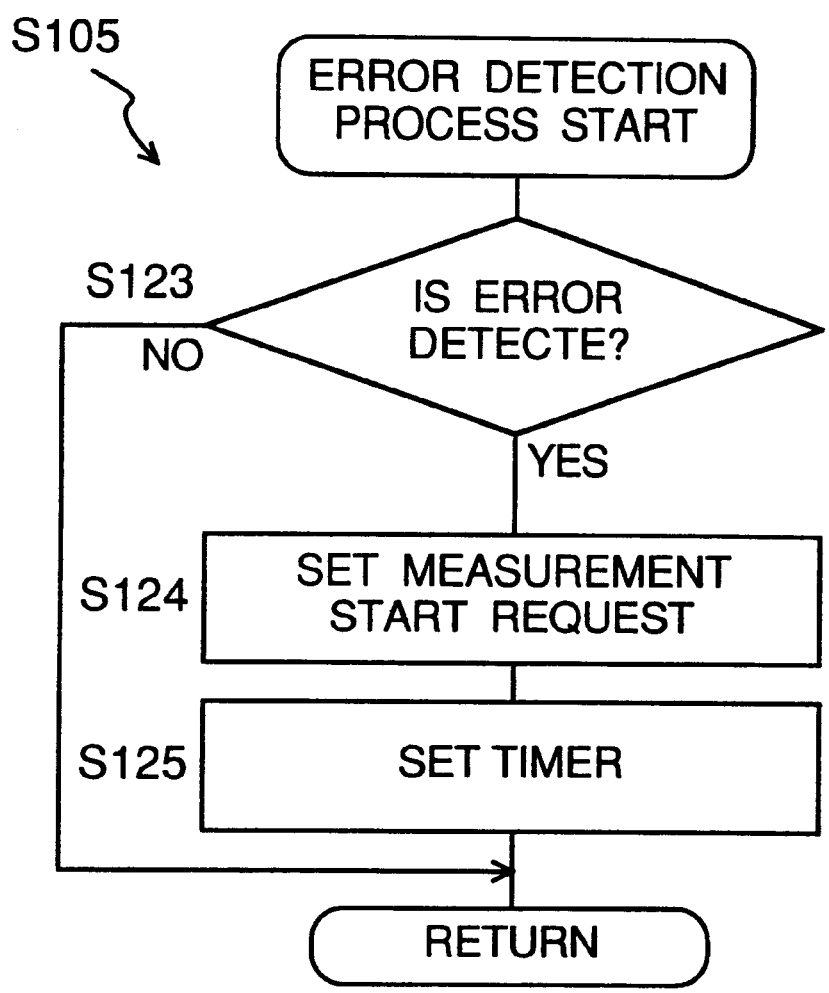
FIG. 25 is a chart showing an error detection process flow in FIG. 20.

In detail, as shown in FIG. 25, it is decided in step S123 whether or not an error such as jam or paper emptiness is occurring. When an error is occurring, the program flow proceeds to step S124 to set the measurement start request and subsequently set the timer in the subsequent step S125, and the program flow proceeds to step S106 shown in FIG. 20. When no error is occurring in step S123, the program flow proceeds directly to step S106 shown in FIG. 20.

v) Next, a measurement process is executed in step S106 shown in FIG. 20.

Figure 26:
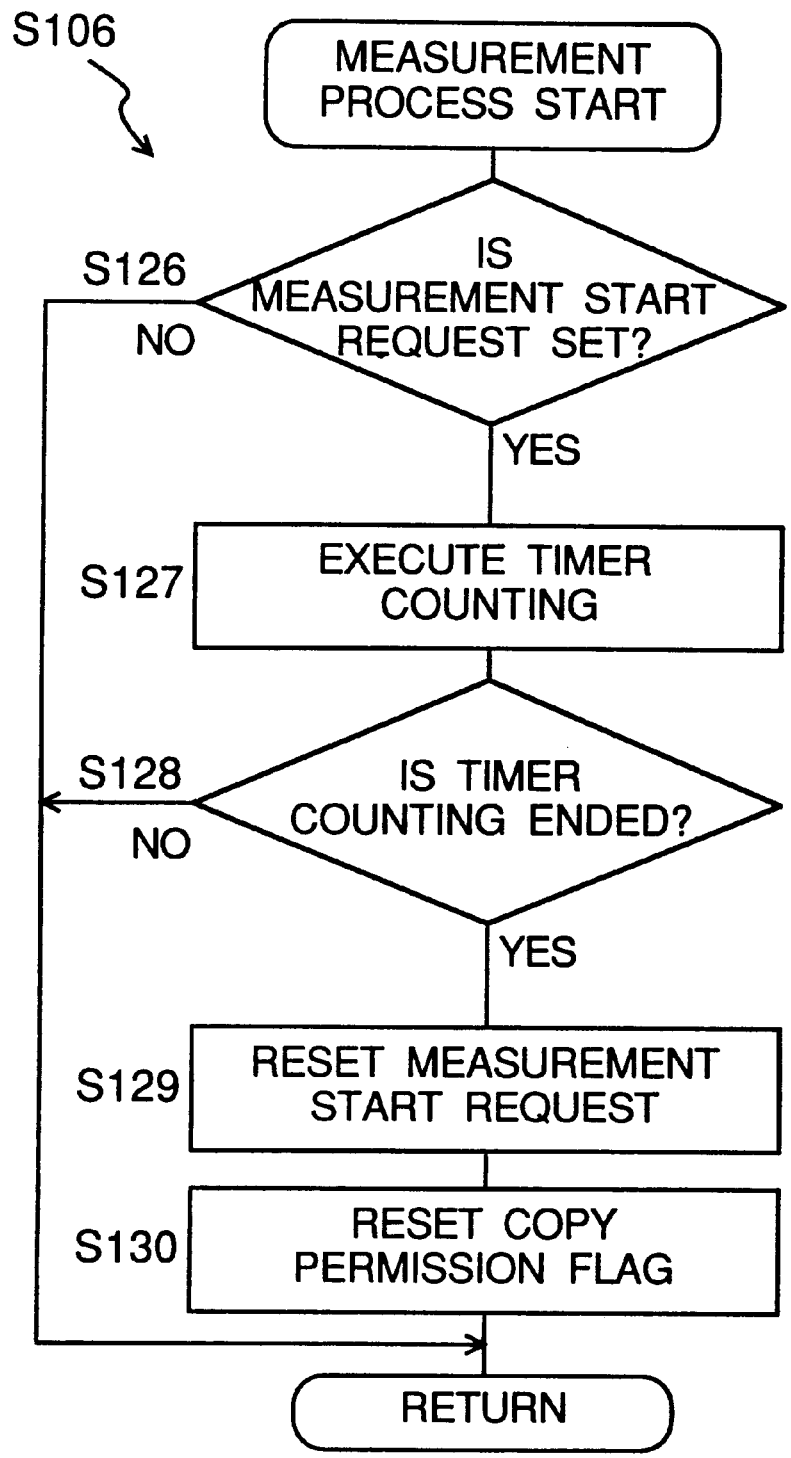
FIG. 26 is a chart showing a measurement process flow in FIG. 20.

In detail, as shown in FIG. 26, it is decided whether or not a measurement start request is set in step S126. When the measurement start request is set, the program flow proceeds to step S127 to execute timer counting, and it is decided in step S128 whether or not the timer counting is ended. When the timer counting is ended, the measurement start request is reset in step S129, and the copy permission flag is subsequently reset in step S130. Thereafter the program flow proceeds to step S107 shown in FIG. 20. When the measurement start request is not set in step S126 or when the timer counting is not ended in step S128, the program flow proceeds directly to step S107 shown in FIG. 20.

vi) Next, the copy inhibition/permission process is executed in step S107 shown in FIG. 20.

Figure 27:
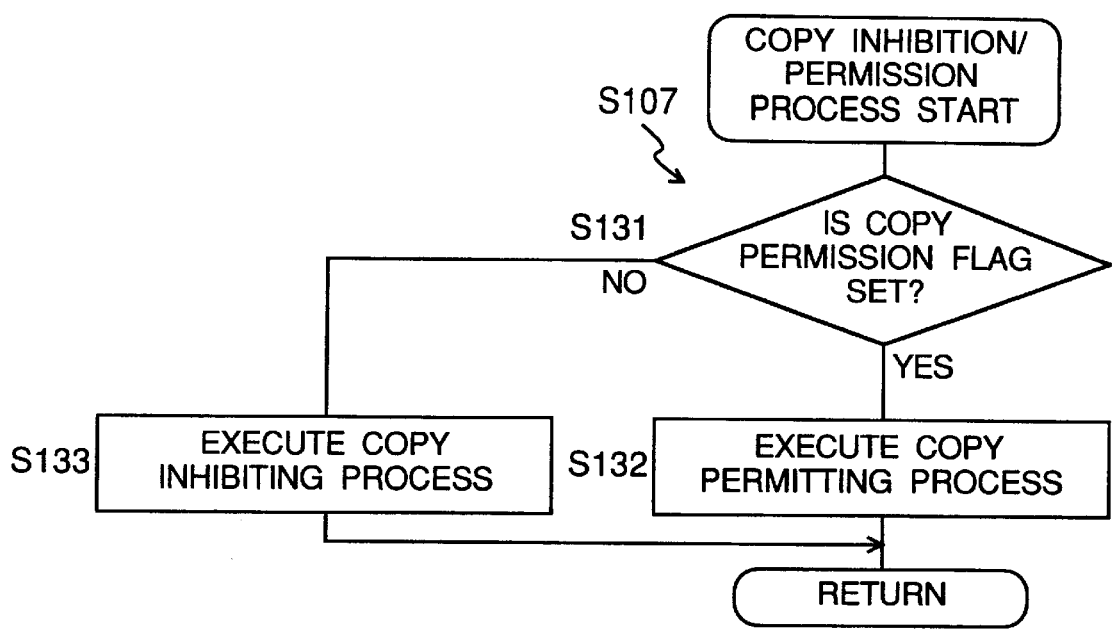
FIG. 27 is a chart showing a copy inhibition/permission process flow in FIG. 20.
Figure 28:
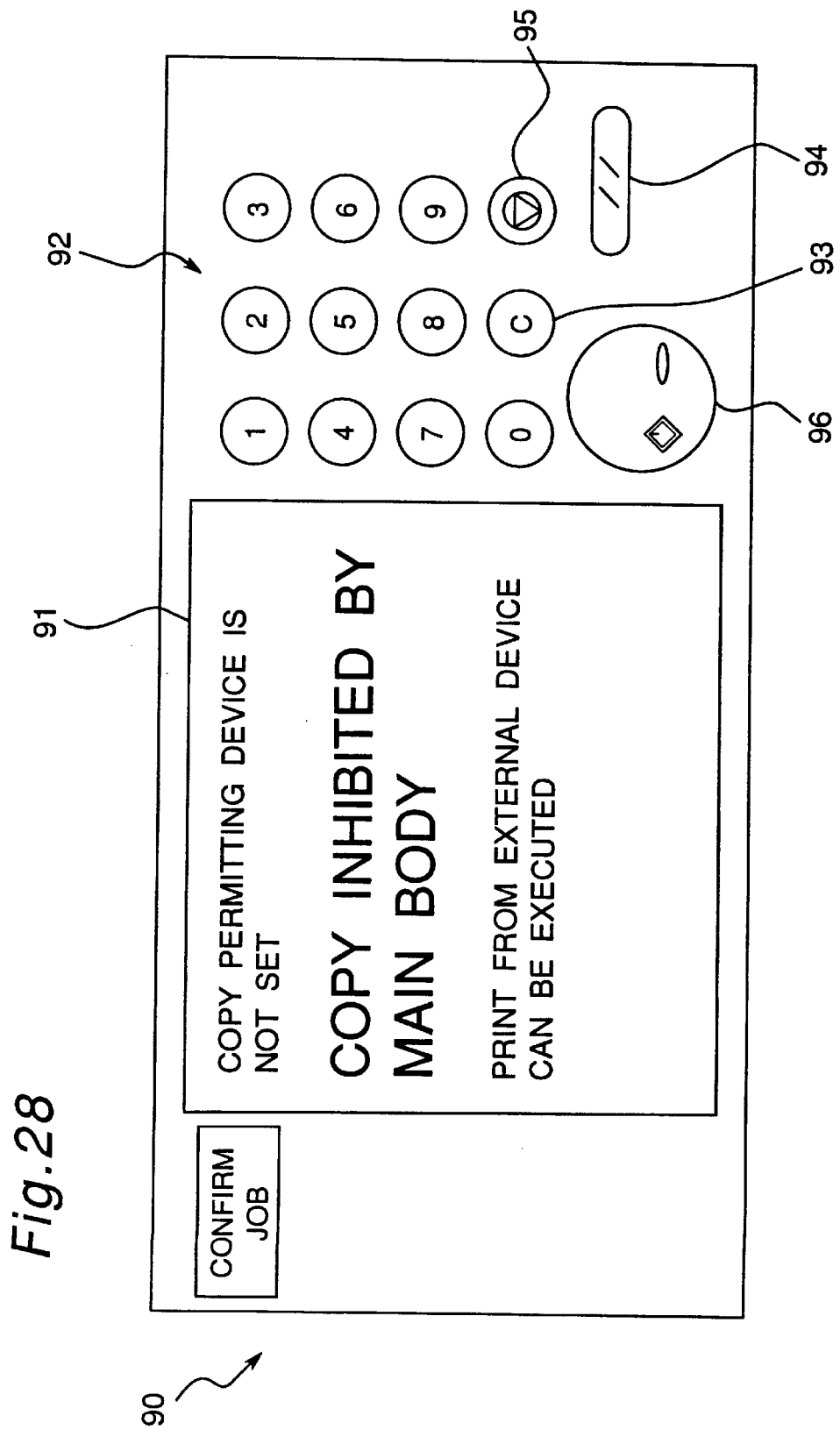
FIG. 28 is a view showing an operation panel of the copying machine, where a LCD touch panel screen shows a copy-inhibited state.

In detail, as shown in FIG. 27, it is decided in step S131 whether or not the copy permission flag is set. When the copy permission flag is set, the program flow proceeds to step S132 to execute a copy permitting process. This copy permitting process is a process for bringing the copying machine 1 into the copy-permitted state and displaying the information of "ready to copy" or the like on the screen of the LCD touch panel 91 as shown in FIG. 3. When the copy permission flag is not set in step S131, the program flow proceeds to step S133 to execute a copy inhibiting process. This copy inhibiting process is a process for keeping the copying machine 1 in the copy-inhibited state until the key counter is set again and displaying the information of "copy inhibited by main body" or the like on the screen of the LCD touch panel 91 as shown in FIG. 28.

vii) Next, a print/copy process and other processing are executed in step S108 shown in FIG. 20. Finally, waiting for the end of the internal timer in step S109, the program flow returns to step S102.

It is to be noted that the setting of various timers in the copying machine 1 is executed using the time unit of this one routine.

After the key counter is thus reset, the copying operation of only one job can be executed. Even when the key counter is in a set state, the copying operation can be inhibited after the elapse of the specified period of time (timer setting period in step S116) after the completion of one job. Therefore, even if the operator forgets to pull out the key counter, then the opportunistic use of the copying machine 1 by another person by means of the key counter can be prevented. When an error occurs during the execution of a job, the copying operation can be inhibited after the elapse of the specified period of time (timer setting period in step S125) after the error detection even the key counter is in the set state. Therefore, even if another person cancels the error in a state in which the operator forgets to pull out the key counter, then the opportunistic use of the copying machine 1 by another person by means of the key counter can be prevented.

It is to be noted that a request for copying is accepted from the external device (personal computer, facsimile or the like) even in the copy-inhibited state, and the copying operation is executed. Therefore, in the present second embodiment, the control procedure on the personal computer side shown in FIG. 18 and FIG. 19 of the aforementioned first embodiment is also altered. Specifically, the processes of S59 and S60 shown in FIG. 18 and S63 shown in FIG. 19 are eliminated. In this case, the key counter is not monetarily charged for the print relevant to the request from the external device.

The Invention being thus described, it will be obvious that the same may be obvious that the same may be varied in many ways. Such variations are not be regarded as a departure form the sprit and scope of the Invention, and all such modifications as would be obvious to one skilled in the art are Intended to be included within the scope of the following claims.

What is claimed is:

1. An image forming apparatus, comprising:
   print request controls accepting a print request;
   permission controls permitting a print operation of the image forming apparatus in response to a specified operation executed by an operator;
   print controls executing a print job corresponding to the print request when the print request has been accepted by the print request controls in a state in which print operation has been permitted by the permission controls;
   inhibition controls for, when the print request has been accepted by the print controls, inhibiting execution of a subsequent print job corresponding to a subsequent print request, wherein
      the inhibition controls inhibit the execution of the subsequent print job after the current print job has been completed by the print controls, and
      the inhibition controls comprise a timer measuring a specified time, measured by the timer from the specified time after the current print job has been completed by the print controls, and inhibiting the execution of the subsequent print job.

2. An image forming apparatus as claimed in claim 1, wherein
   said specified operation executed by an operator is an operation of a key counter.

3. An image forming apparatus as claimed in claim 1, wherein
   said specified operation executed by an operator is an operation of a prepaid card.

4. An image forming apparatus as claimed in claim 1, wherein
   said specified operation executed by an operator is an operation of a coin vendor.

5. An image forming apparatus as claimed in claim 1, wherein
   said specified operation executed by an operator is an operation of an ID code input.

6. An image forming apparatus, comprising:
   print request controls accepting a print request;
   permission controls permitting a print operation of the image forming apparatus in response to a specified operation executed by an operator;
   print controls executing a print job corresponding to the print request when the print request has been accepted by the print request controls in a state in which print operation has been permitted by the permission controls;
   inhibition controls for, when the print request has been accepted by the print controls, inhibiting execution of a subsequent print job corresponding to a subsequent print request; and
   the inhibition controls inhibit the execution of the subsequent print job after detecting an error during the execution of the print job by the print controls; wherein
      the inhibition controls comprise a timer for measuring a specified time, measured by the timer from the specified time after detecting the error, and inhibiting the execution of the print job.

7. An image forming apparatus, comprising:
   print request controls accepting a print request;
   permission controls permitting a print operation of the image forming apparatus in response to a specified operation executed by an operator;
   print controls executing a print job corresponding to the print request when the print request has been accepted by the print request controls in a state in which print operation has been permitted by the permission controls; and
   inhibition controls for, when the print request has been accepted by the print controls, inhibiting execution of a subsequent print job corresponding to a subsequent print request, wherein
      the inhibition controls inhibit an original document copying operation while permitting a print job for image data from an external apparatus to which the image forming apparatus is connected.

8. An image forming method, comprising:
   accepting a print request;
   permitting a print operation in response to a specified operation executed by an operator;
   executing a print job corresponding to the print request when the print request is accepted in a state in which print operation has been permitted;
   inhibiting execution of a subsequent print job corresponding to a subsequent print request when the current print request has been accepted, wherein
      the execution of the subsequent print job is inhibited after the print job has been completed, and
      a specified time after completing the print job is measured, and the subsequent print job is inhibited.

9. An image forming method as claimed in claim 8, wherein
   said specified operation executed by an operator is an operation of a key counter.

10. An image forming method as claimed in claim 8, wherein
said specified operation executed by an operator is an operation of a prepaid card.

11. An image forming method as claimed in claim 8, wherein
said specified operation executed by an operator is an operation of a coin vendor.

12. An image forming method as claimed in claim 8, wherein
said specified operation executed by an operator is an operation of an ID code input.

13. An image forming method, comprising:

accepting a print request;

permitting a print operation in response to a specified operation executed by an operator;

executing a print job corresponding to the print request when the print request is accepted in a state in which print operation has been permitted;

inhibiting execution of a subsequent print job corresponding to a subsequent print request when the current print request has been accepted; and the execution of the subsequent print job is inhibited after an error is detected during the execution of the current print job, wherein
a specified time during the execution of the print job is measured after detecting the error, and the execution of the print job is inhibited.

14. An image forming method, comprising:

accepting a print request;

permitting a print operation in response to a specified operation executed by an operator;

executing a print job corresponding to the print request when the print request is accepted in a state in which print operation has been permitted;

inhibiting execution of a subsequent print job corresponding to a subsequent print request when the current print request has been accepted, wherein
an original document copying operation is inhibited while a print job for image data from an external apparatus is permitted.

* * * * *